(12) United States Patent
Zeng

(10) Patent No.: US 11,105,753 B2
(45) Date of Patent: Aug. 31, 2021

(54) WAFER SHAPE AND FLATNESS MEASUREMENT APPARATUS AND METHOD

(71) Applicant: Nanjing LiAn Semiconductor Limited, Jiangsu (CN)

(72) Inventor: An Andrew Zeng, Fremont, CA (US)

(73) Assignee: Nanjing LiAn Semiconductor Limited, Nanjing (CN)

(*) Notice: Subject to any disclaimer, the term of this patent is extended or adjusted under 35 U.S.C. 154(b) by 0 days.

(21) Appl. No.: 17/188,932

(22) Filed: Mar. 1, 2021

(65) Prior Publication Data

US 2021/0199597 A1 Jul. 1, 2021

Related U.S. Application Data

(63) Continuation of application No. PCT/US2020/049009, filed on Sep. 2, 2020.

(60) Provisional application No. 62/953,696, filed on Dec. 26, 2019.

(51) Int. Cl.
*G01N 21/95* (2006.01)
*G01B 11/24* (2006.01)

(52) U.S. Cl.
CPC ..... *G01N 21/9501* (2013.01); *G01B 11/2441* (2013.01); *G01B 2210/56* (2013.01)

(58) Field of Classification Search
CPC .................................................. G01N 21/95
See application file for complete search history.

(56) References Cited

U.S. PATENT DOCUMENTS

| 5,534,073 | A  | * | 7/1996  | Kinoshita ............. B25B 11/005 118/728 |
| 6,257,564 | B1 | * | 7/2001  | Avneri ................... B25B 11/005 269/21 |
| 6,652,357 | B1 | * | 11/2003 | Williams ................ B24B 41/04 257/E21.23 |
| 9,221,081 | B1 | * | 12/2015 | Mayer ................. H01L 21/6723 |
| 9,279,774 | B2 |   | 3/2016  | Romanovsky et al. |
| 10,254,214 | B1 | * | 4/2019  | Griffith .............. G01N 21/8806 |
| 2002/0188370 | A1 | * | 12/2002 | Saldana ................ B24B 53/017 700/121 |
| 2004/0206304 | A1 | * | 10/2004 | Menear ............... H01L 21/6838 118/500 |

(Continued)

FOREIGN PATENT DOCUMENTS

KR   10200340741   *  6/2003   ........... H01L 21/027

OTHER PUBLICATIONS

International Search Report and Written Opinion for International Patent Application No. PCT/US2020/049009, dated Nov. 17, 2020.

(Continued)

*Primary Examiner* — Tarifur R Chowdhury
*Assistant Examiner* — Omar H Nixon
(74) *Attorney, Agent, or Firm* — Veros Legal Solutions LLP

(57) ABSTRACT

A semiconductor equipment architecture WGT for wafer shape and flatness measurement is disclosed. The semiconductor equipment architecture WGT includes a reflective air-bearing chuck and a hybrid wafer thickness gauge. Also disclosed are the corresponding methods of measuring wafer shape and flatness using the architecture, the air-bearing chuck and the hybrid wafer thickness gauge.

20 Claims, 16 Drawing Sheets

(56) References Cited

U.S. PATENT DOCUMENTS

| | | | |
|---|---|---|---|
| 2005/0035514 A1* | 2/2005 | Hillman | H01L 21/6838 269/21 |
| 2007/0247640 A1 | 10/2007 | Magome et al. | |
| 2008/0229811 A1* | 9/2008 | Zhao | F16C 29/025 73/104 |
| 2011/0114623 A1* | 5/2011 | Goodman | H01L 21/6719 219/385 |
| 2012/0268742 A1* | 10/2012 | Hatano | G01R 31/2656 356/364 |
| 2013/0088714 A1* | 4/2013 | Terada | H01L 21/6838 356/237.5 |
| 2019/0257647 A1* | 8/2019 | Ichinose | G01B 11/272 |
| 2019/0265596 A1 | 8/2019 | Lof et al. | |

OTHER PUBLICATIONS

New Way Bearings Air Bearing Application and Design Guide [online] Jan. 2006 [retrieved on Oct. 21, 2020], www.newairbearings. com, pp. 1-68, Aston, PA.

\* cited by examiner

WAFER SHAPE AND FLATNESS MEASUREMENT APPARATUS AND METHOD

CROSS REFERENCE TO RELATED APPLICATION

This application is a continuation of PCT Application No. PCT/US2020/049009, filed on Sep. 2, 2020, which claims priority to U.S. Provisional Patent Application Ser. No. 62/953,696, filed on Dec. 26, 2019, and each application is hereby incorporated by reference in its entirety.

FIELD

This relates generally to a tool architecture for wafer geometry measurement in the semiconductor industry and, more specifically, to a semiconductor equipment architecture wafer geometry tool using a reflective air-bearing chuck and an interferometer (For example, a Fizeau interferometer, a grating-based shearing interferometer, or other types of interferometers) for wafer shape and flatness measurements.

SUMMARY

In one aspect of this disclosure, a semiconductor equipment architecture Wafer Geometry Tool (WGT), using a reflective air-bearing chuck and a single interferometer for wafer shape and flatness measurement is disclosed. In other aspects of the disclosure, subsystems of the WGT tool architecture, namely, a reflective air-bearing chuck and a hybrid wafer thickness gauge, are disclosed. Also disclosed are the corresponding methods of measuring wafer shape and flatness using the architecture and subsystems disclosed herein.

DETAILED DESCRIPTION OF THE PREFERRED EMBODIMENTS

Figure 1A:
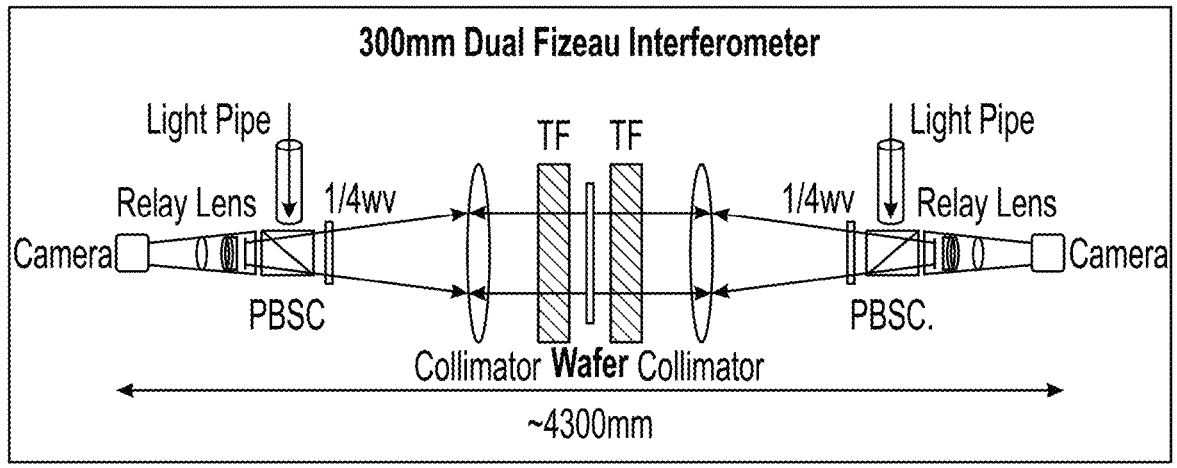
FIG. 1a illustrates a dual Fizeau interferometer architecture that is currently used in 300 mm fabs for wafer geometry measurement as well as for pattern wafer geometry measurement.

In the following description of preferred embodiments, reference is made to the accompanying drawings which form a part hereof, and in which it is shown by way of illustration specific embodiments, which can be practiced. It is to be understood that other embodiments can be used and structural changes can be made without departing from the scope of the embodiments of this disclosure. For example, a single Fizeau interferometer is illustrated in FIG. 1c of this application, however, other type of interferometers, such as shearing interferometer can also be used in the place of Fizeau interferometer in the various embodiments of this tool architecture.

In this document, "wafer geometry" can refer to wafer shape, as well as local flatness parameters (e.g., site flatness SFQR, and SBIR), and global flatness (GBIR). Wafer flatness (or total thickness variation (TTV)) can refer to high density raw data (>=4Mpixels/wafer) that can be used for deriving SFQR, GBIR, and many other related parameters. Flatness data is normally associated with both front and backside surface information. Wafer shape parameters can be derived from a single surface height map. It can be either the front or the back surface of the wafer, or medium of the two surfaces (SEMI definition of wafer shape). For advanced 300 mm wafer, the difference of Medium value of the front and backside shape and the front surface only or back surface only is very small for an advanced 300 mm wafer. This is because wafer shape is in the order of a few micron to a few hundred micron, while TTV or GBIR is in the order of tens or hundreds of nanometers. In pattern wafer geometry tools, wafer shape can be calculated from either the front surface or the back surface, depending on suppliers of the tools. WaferSight PWG™ calculate wafer shape from backside of the wafer, while SuperFast tool (a wafer shape measurement tool originated from Ultratech, acquired by Veeco, and now sold to KLA) is a single shearing interferometer, measuring the front side of the wafer.

Wafer geometry tool ("WGT") is a metrology tool that can be used in Si wafer manufacturing fabs for characterizing wafer flatness, nano-topography and shape (bow and warp). It can also be used in glass wafer fab. Typically, each wafer has to be certified by WGT type of tools before shipping to a customer. There are several existing tools serving this purpose. For example, ADE's capacitive sensor-based wafer-geometry tools are widely used in 200 mm wafer fabs. KLA has a more advanced tool for measuring wafer geometry of 300 mm wafers, which is based on a dual Fizeau interferometer method, as illustrated in FIG. 1a. Interferometer-based wafer geometry tool has the advantage in both precision and throughput. Its precision is about one to two magnitude better than that of capacitive sensor-based tool, despite of the fact that 300 mm wafer is more prune to vibration than that of 200 mm wafer. However, there have been no interferometer-based 200 mm wafer geometry tool on the market. Capacitive sensor-based wafer geometry tools were designed for 250 nm, 180 nm, and 130 nm node processes. Capacitive sensor tool cannot keep up with the precision and throughput requirement for design nodes smaller than 90 nm.

Figure 1B:
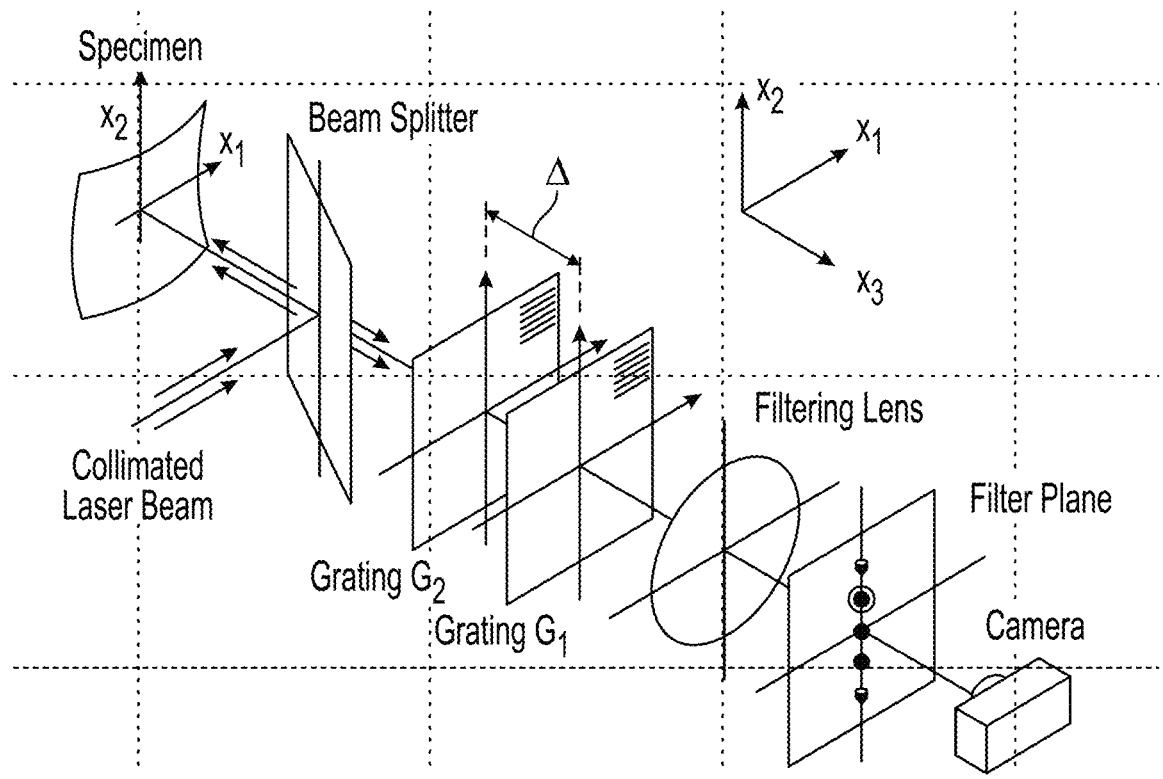
FIG. 1b is another PWG tool that has been used in pattern wafer geometry measurement.
Figure 1C:
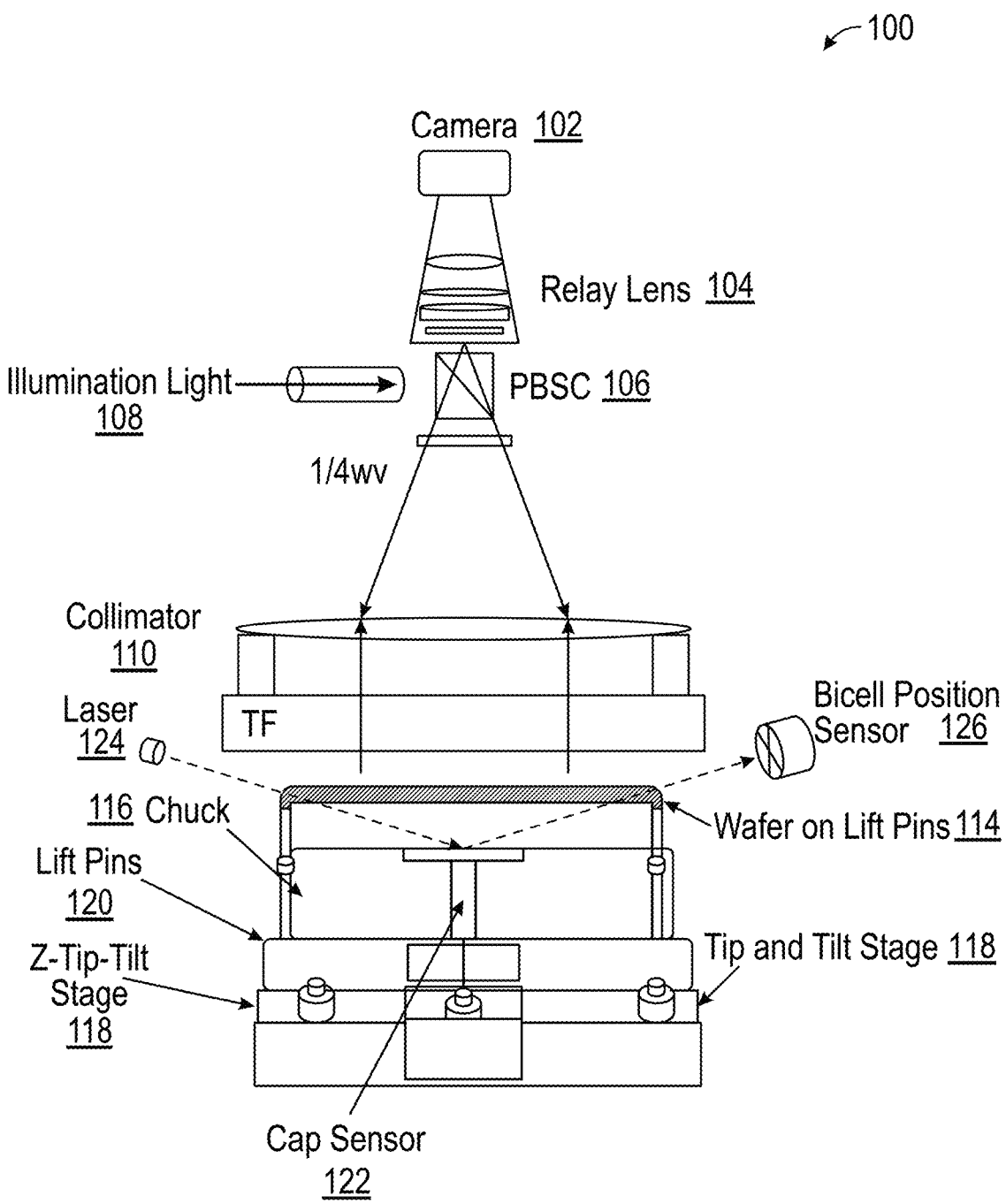
FIG. 1c illustrates a wafer geometry tool (WGT) architecture of a single Fizeau interferometer, according to an embodiment of the disclosure.

FIG. 1b illustrates another PWG tool that has been used in pattern wafer geometry measurement. (See U.S. Pat. No. 7,369,251 B2). The PWG tool of FIG. 1b is a transmission grating-based shearing interferometer. It measures the shape of a wafer while the wafer is supported on 3 pins. The measured shape included wafer deformation under gravity and has to be calibrated out through algorithm.

Dual Fizeau interferometer architecture of 300 mm tool has been used in 300 mm fabs. However, it cannot be used for smaller fabs such as 200 mm wafer since 200 mm wafer is single side polished. The backside of the wafer does not reflect light. There has been no wafer geometry tool with a single interferometer ("WGT") even though there are market needs for such a tool, namely, an accurate and cost-effective tool for 200 mm wafer house or a cost effective and high throughput pattern wafer geometry tool for memory and logic fabrication planets ("fabs"). There are at least a few reasons that no WGT has existed. First, it is difficult to measure flatness or total thickness variation (TTV) of a wafer from one side of the wafer without information of the other side. One method to measure TTV is to use a vacuum chuck, where the backside of a wafer is vacuumed down and flattened on the chuck. As a result, the TTV of the wafer can show up on the front side, which could cause defocus errors in lithography process and cause yield loss.

WGT Architecture

In one aspect, this disclosure relates to a semiconductor equipment architecture WGT for wafer shape and flatness measurement for various types of wafers such as 200 mm wafers. WGT can have better precision and throughput than cap sensor or optical sensor-based scanning tools. Embodiments of the WGT disclosed herein can also be used for 300 mm and 450 mm wafer geometry tools. The advantages of using WGT for 300 mm wafers over current 300 mm tools in the fabs include better precision and accuracy for wafer shape measurement, lower cost of ownership ("COO"), throughput, footprint, and ease of service and manufacturing. In addition to wafer geometry tools, the disclosed architecture can also be used in patterned wafer geometry (PWG) tools for making wafer shape measurement. The air-bearing chuck supports a wafer with an air cushion during the wafer shape measurement. The air-bearing film or cushion of the chuck has very small stiffness. It exerts just enough force to support the wafer, but does not deform it. This is the ideal condition for wafer shape measurement.

FIG. 1c illustrate an exemplary tool WGT architecture that can perform the same measurement as a Dual Fizeau tool, but at a fraction of the cost. For wafer shape measurement, it has significant advantages over the existing dual Fizeau tools. As illustrated in FIG. 1c, the WGT 100 can include a single Fizeau interferometer that includes a camera 102, relay lens 104, a PBSC 106, a light source (e.g., illumination light) 108, collimator 110, and test flat (TF) 112, all in optical communication with each other as illustrated. The operation of a Fizeau interferometer is well known and thus is not described in detail here. In this architecture, the single Fizeau interferometer is set up for measuring the shape of a wafer 114. This architecture does not limit to Fizeau interferometer, other interferometer types, such as shearing interferometers, can also benefit from this architecture for wafer shape and flatness measurement.

As illustrated in FIG. 1c, the wafer can lay horizontally on an air cushion generated on the top surface of an air-bearing chuck 116. The air-bearing chuck 116 can include multiple alternating pressure and vacuum channels 130, 132 for creating and maintaining an air cushion on the top surface of the air-bearing chuck 116. The air-bearing chuck 116 can also include a Z-tip-tilt stage 118 that can tip and/or tilt the air-bearing chuck 116. Multiple lift pins 120 can be provided for lifting the wafer up from the surface of the air-bearing chuck 116. The structure of the air-bearing chuck is further discussed in detail below with reference to FIGS. 4a-4d.

Referring again to FIG. 1c, a combination of a capacitive sensor 122 at the bottom of wafer (embedded in the air-bearing chuck 116) and one or more optical position sensors (bi-cell, or Position Sensing Detector) 126 along with a laser 124 on the top of the wafer 114 can be incorporated into the WGT architecture 100 to measure the thickness of the wafer 114. Bi-cell readings can be calibrated by using wafers with known thickness. The bi-cell position can be correlated to the wafer top surface height. The capacitive sensor 122 can measure the wafer bottom surface position. The combined information of the top and bottom surface positions can be used for accurately determining the thickness of the wafer 114.

There is an added advantage of the bi-cell position sensor at the top of wafer 114. The bi-cell reading can be correlated directly to wafer thickness. The bi-cell readings can also tell the relative motion/vibration between the wafer 114 and TF 112. Wafer vibration could be introduced by the air-bearing chuck/flange/supporting mechanism, which could not be seen by the capacitive sensor 122 because the capacitive sensor 122 moves with the unit that includes the wafer 114 and the air-bearing chuck 116.

The tool interferometer can be used to calibrate the cap sensor and the bi-cell or PSD. This architecture enables the most advanced wafer thickness measurement tools, which leverage the accuracy of the interferometer, and the large range of the other sensors. Both the capacitive sensor 122 and the optical (bi-cell, or PSD) position sensor 126 can see air-bearing stability issues, but only the optical (bi-cell, or PSD) sensor can see chuck assembly vibration. This can be useful when there is need to isolate the source of vibration.

It should be understood that this architecture of FIG. 1c for wafer geometry measurement, including total wafer shape and wafer thickness variation (aka flatness), is not limited to a Fizeau interferometer. Other interferometer, such as shearing interferometer, can also be used in the disclosed architecture of using a reflective air-bearing chuck.

Figure 1D:
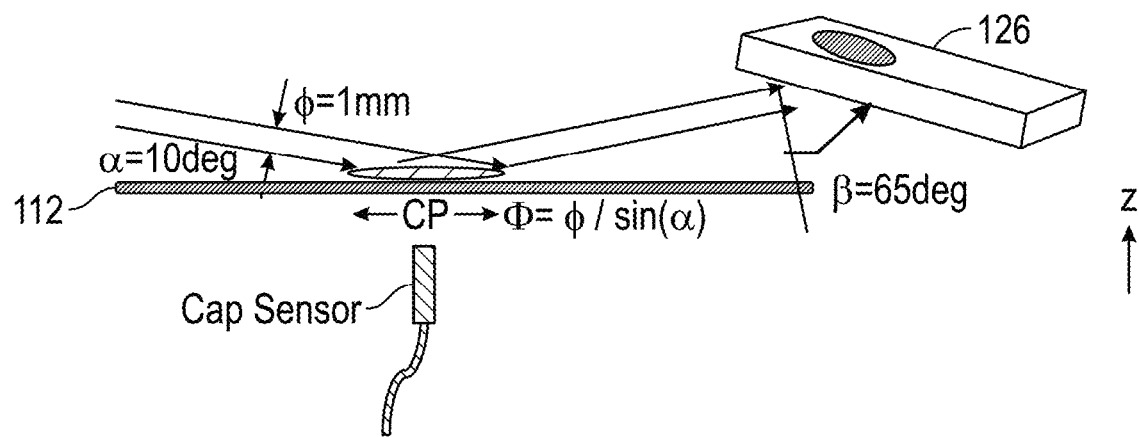
FIG. 1d provides an enhanced view of the bi-cell position censor at an optimal working angle, according to an embodiment of the disclosure.

In one embodiment, a method of determining the optimal angles at which the laser and/or bi-cell position sensor are positioned is disclosed. Referring to FIG. 1d, for best Z-axis resolution, the bi-cell position sensor 126 is preferable positioned at the maximum angle β from TF 112 that the sensor size allows. If Δh is the Z direction resolution (or z-sensitivity), it is dominated by beta angle.

$$\Delta h = \Delta L * \cos\beta / (2 \cos(\alpha))$$

Where ΔL is the minimum displacement detectable by the bi-cell position sensor 126, which can be ~0.75 um for certain commercially-available censors.

$$\Delta h = \Delta L / M$$

Where $M = [\cos\beta / (2 \cos(\alpha))]^{-1}$

Due to grazing angle incidence, Cos(α) is ~1, α being the angle between the light source (e.g., laser (not shown in FIG. 1d) and TF 112, typically set at 10-15 degrees. As β increase, M also increases based on the formula above, which means that the sensitivity of the bi-cell position sensor 126 will also increase. However, β may not be too large due to potential enlarging effect on the spot size on the detector (e.g., the spot cannot have a size larger than what the detector can detect). There could also be physical limitations with regard to how far the bi-cell sensor can be positioned in the apparatus. For example, at grazing angle, laser spot size on sensor surface can increase by 1/Sin (90−β)=1/Sin 30=2. For small sensor area, like the Sitek PSD, 2×2 mm, there are not much room for tilting. For easy alignment, 10×10 mm sensor at 250 nm resolution can be used. Table 1 below lists the various PSD resolutions in nm based on the different α and β angles.

TABLE 1

| α (degree) | 10.00 | 0.0175 | | | |
|---|---|---|---|---|---|
| β (degree) | | 0.00 | 45.00 | 60.00 | 75.00 |
| Mag (M) | | 1.97 | 2.79 | 3.94 | 7.61 |
| PSD Res (nm) | 250.000 | 126.93 | 89.75 | 63.46 | 32.85 |

Figure 1E:
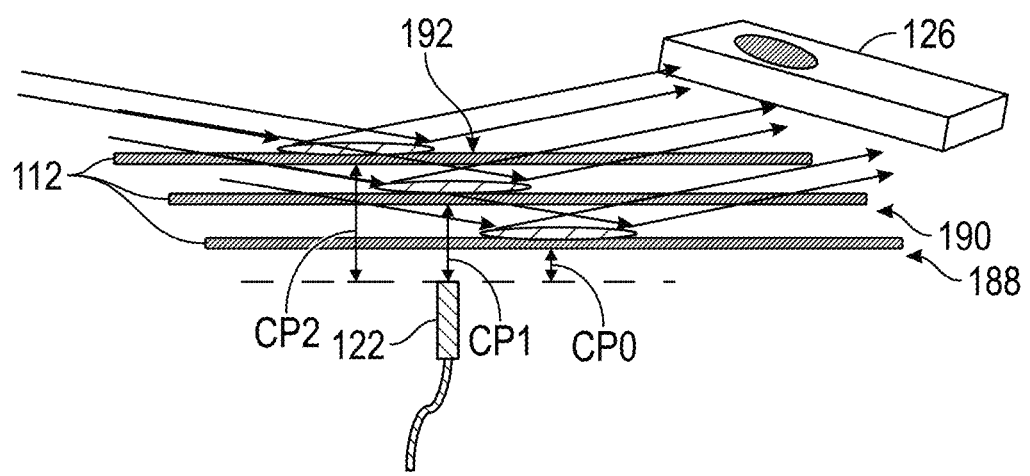
FIG. 1e illustrates the calibration of the bi-cell position censor, according to an embodiment of the disclosure.

As illustrated in FIG. 1e, to calibrate the bi-cell position sensor 126, TF 112 can be adjusted up and down in various positions. In this example, calibration wafer thickness T0 can be set at 725 um; though each wafer can be slightly different. Its thickness can be measured by CMM or other thickness tools. Zero flying height at position 188 can be set by vacuuming down the wafer on the air-bearing chuck by using a clean wafer and read capacitive sensor reading CP0, which can be set as zero for CP. Position sensor (V0(+−10V)) reading from the bi-cell position sensor 126 can be read then. Then, vacuum and pressure can be adjusted so that wafer is floating at position 190 where capacitive sensor reading of CP1−CP0=20 um (or around 20 um). Position sensor reading V1 of CP2−CP0 can be recorded.

Next, vacuum and pressure can be adjusted again until capacitive sensor reading (CP2−CP0) is around 30 um. Position sensor reading V2 can be recorded. The above steps can be repeated for capacitive sensor reading CP3, CP4, CP5 . . . at 40 um, 50 um, 60 um . . . , respectively. Next, Δ(CPn−CP0), e.g., CP1−CP0, CP2−CP0, . . . can be calculated. Table 2 illustrates exemplary results from the calculation.

TABLE 2

| Cap sensor reading CPn (um) | CP0 = 500 | CP1 = 520 | CP2 = 530 | CP3 = 540 | CP4 = 550 | CP5 = 560 |
|---|---|---|---|---|---|---|
| Δ (CPn − CP0) = hx | 0 | 20 | 30 | 40 | 50 | 60 |
| PSD position voltage | v0 | V1 | v2 | v3 | v4 | v5 |

Figure 1F:
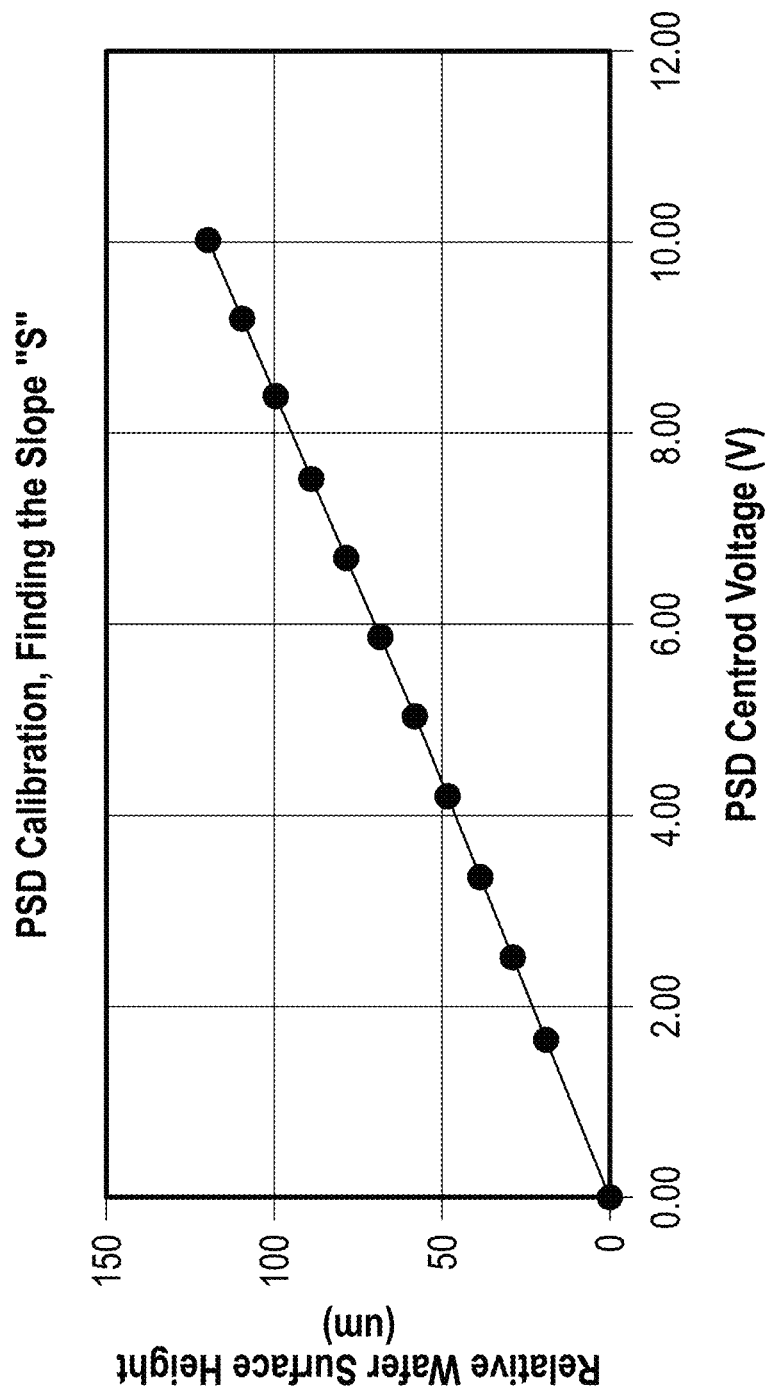
FIG. 1f illustrates data from performing a step in the calibration of bi-cell position censor, according to an embodiment of the disclosure.

With the above data, hx vs Vx can be plotted and linear fitted to obtain slope, S um/V (see FIG. 1f). Then, calibration data including: 1) Slope, S um/V; 2) wafer thickness T0=725 um, 3) ground level PSD reading: V0, and 4) Ground level cap sensor reading: CP0 can be saved and software implementation of calibration can be performed by using the following formula:

$$T\_wafer = T0 + (CP0 - CP) + S * (V - V0),$$

Where CP is cap sensor reading of wafer flying height

CP0 is capacitive sensor reading when wafer is vacuumed down on the chuck.

V is bi-cell position sensor reading in Volt.

Cap Sensor reading in um can be calculated from factory calibration constant: C=Δh/ΔV, um/volt. Capacitive sensor um reading: CP=C*ΔVcp. The cap sensor can also be calibrated in situ.

Details of the exemplary methods of measuring wafer shape and thickness using the WGT architecture 100 of FIG. 1c are provided below with references to FIGS. 5a, 5b, 6a, and 6b.

This method of using an air-bearing chuck and a single interferometer for wafer geometry measurement has a number of advantages. For example, the air-bearing chuck can provide effective air-damping to the wafer on chuck. The air-damping effect allows not only more accurate interferometer measurement, but also lower cost since it does not require the expensive active isolation system and the heavy-duty acoustic isolator. It also saves cost in wafer transfer inside the tool due to simplified wafer loading process, for example: horizontal wafer loading under the single interferometer, as compared to a dual Fizeau architecture, the single interferometer architecture saves cost by eliminating one interferometer and related optics. Also not needed is the mechanism for rotating wafer 90 degree from horizontal to vertical required in the dual Fizeau architecture. The advantage of this WGT architecture tool is even greater for 300 mm or 450 mm wafers, where vibration of 300 mm and 450 mm wafers can be a major source of noise, making it difficult to achieve a high precision in the flatness measurement. For 300 mm and 450 mm tool, optics components collimators, transmission flats, and folding mirrors are all large and expensive. Eliminating one interferometer, one wafer vertical loading systems, an acoustic isolation box, and one channel of data acquisition system can reduce the cost significantly for original equipment manufacturers (OEMs) as well as to their customers. In addition, embodiments of the air-bearing chuck can provide an air cushion that can serve as a vibration damper. This vibration insensitive property of the disclosed embodiments of the architecture can benefit both low-end and high-end semiconductor metrology tools.

TTV Measurement Method

Figure 5A:
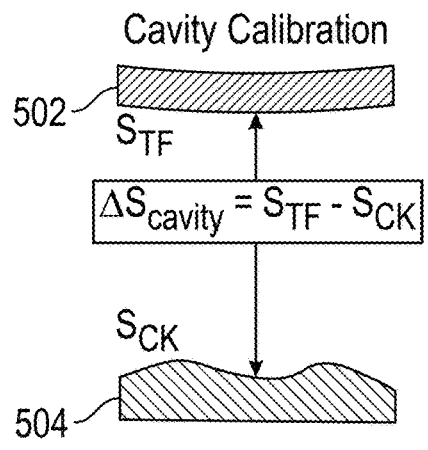
FIGS. 5a and 5b illustrate a method of calculating TTV from calibration and correction data using the WGT tool architecture of FIG. 1c, according to an embodiment of the present disclosure.
Figure 5B:
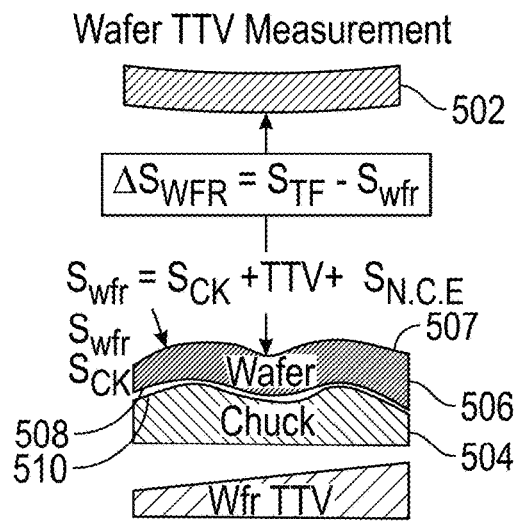

Exemplary steps in measuring the thickness or TTV of the wafer are illustrated in FIGS. 5a and 5b. Referring to FIG. 5a, first, optical cavity formed by the TF 502 and the reflective air-bearing chuck 504 is measured. In other words, the distance variation between TF 502 and opposing surface of the air-bearing chuck 504 is measured. The TF 502 can sag in the middle due to gravity. The surface of the air-bearing chuck 504 may not be perfectly flat, as illustrated in FIG. 5. These imperfection needs to be calibrated out in order to make accurate flatness measurement of wafers. Cavity calibration is to measure the cavity thickness variation. Mathematically it is the difference between the transmission flat surface $S_{TF}$ (x, y) and the chucks surface $S_{CK}$(x, y): $\Delta S_{Cavity} = S_{TF} - S_{CK}$. In this step, there is no wafer on the chuck.

Referring to FIG. 5b, after calibration, a wafer 506 is placed on the surface of the air-bearing chuck 504. To measure the flatness of the wafer 506, the wafer is flying on top of the surface of the air-bearing chuck 504 at a small air gap (e.g., 5 um-30 um) created by the air-bearing chuck 504. At these small gaps, the air-bearing chuck is designed to have significant suction force to flatten the backside of the wafer, or make the backside of the wafer 508 conforms to the chuck surface 510. In that case, the top of surface of the wafer ($S_{WFR}$) 507 is simply addition of Chuck surface 510 and wafer total thickness variation, $S_{wfr}$, $S_{CK}$+TTV. However, the backside of wafer 508 is not conforming to chuck surface 510 perfectly in reality. A nonconforming term ($S_{N.C.}$) needs to be added in order to accurately determine the top wafer surface 507: $S_{wfr} = (S_{CK} + TTV + S_{N.C.})$.

The interferometer measurement can measure the distance between the wafer 506 and the transmission flat: $\Delta S_{WFR} = (S_{TF} - S_{WFR}) = (S_{TF} - S_{CK} - TTV - S_{N.C.})$ Next, TTV can be calculated by taking the difference between the cavity and the wafer surface measurement: $(\Delta S_{Cavity} - \Delta S_{WFR})$. The total thickness variation can be then calculated as follows: $TTV_{actual} = (\Delta S_{Cavity} - \Delta S_{WFR} - S_{N.C.})$, where $\Delta S_{Cavity}$ and $\Delta S_{WFR}$ can be measured by the Fizeau interferometer of the WGT architecture illustrated in FIG. 1c. $S_{N.C.}$ can be obtained from calibration. $S_{N.C.}$ can be a function of wafer thickness which can vary +−25 um or 25/775=3%. We measure wafer thickness and can use the wafer thickness information for further correction of the nonconforming error if necessary. $S_{N.C.}$ can be obtained by using a wafer with known TTV (e.g., a double side polished 200 mm wafer): $S_{N.C.} = (\Delta S_{Cavity} - \Delta S_{WFR} - TTV_{known})$.

$S_{N.C.}$ may drift over time and need calibration from time to time. $S_{N.C.}$ is a function of wafer thickness, temperature, FH and chuck flatness. All these parameters can be measured simultaneously with interferometer data. They can be used for a $2^{nd}$ order correction.

Shape Measurement Method

Figure 6A:
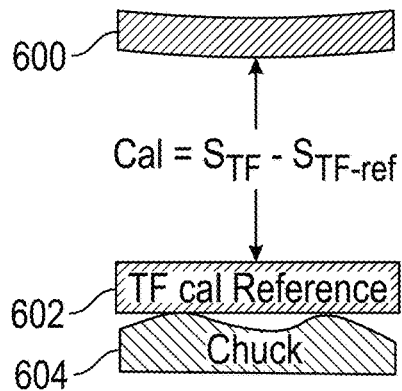
FIGS. 6a and 6b illustrate a method of cavity calibration for shape measurement using the WGT tool architecture of FIG. 1c, according to an embodiment of the present disclosure.
Figure 6B:
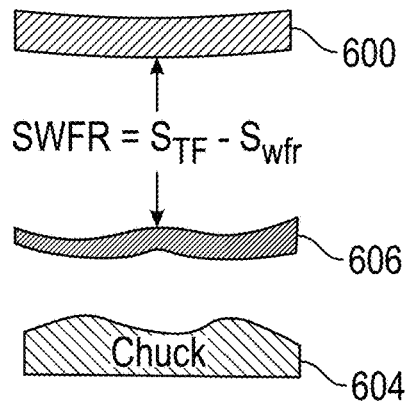

FIGS. 6a and 6b illustrate the exemplary steps in a shape measurement method using the WGT architecture illustrated in FIG. 1c, according to an embodiment of the disclosure. Referring to FIG. 6a, to measure shape, first, a reference TF 602 is placed on the surface of an air-bearing chuck 604 to calibrate the TF 600 in the tool. $Cal = S_{TF} - S_{TF-ref}$. Reference TF flatness (in nm) can be much better than that of a wafer shape (in um). So $S_{TF-ref}$ is a piston term and can be dropped. If the TF 600 is thick and there is minimum TF sag, the cavity calibration step can be skipped as well. In this step, there is no wafer on the chuck. This calibration can be done at a factory. Only tilt correction may be done at measurement time, assuming that the TF shape does not change.

Referring to FIG. 6b, in the next step, a wafer 606 is placed on the top surface of the air-bearing chuck 604. To measure the shape, the wafer 606 is flying at a large air gap (e.g., 60 um-300 um). The chuck is designed and operated in such way that the pressure force balanced out the gravity, leaving no addition force to deform the wafer. As a result, at these large airgap, the wafer 606 takes its natural shape while supported by the air cushion.

$$SWFR = (S_{TF} - S_{wfr})$$

Next, the difference between Cal and the wafer surface measurement is obtained to calculate the wafer shape:

$$Shape = Cal - SWFR = (S_{TF} - S_{TF-ref}) - (S_{TF} - S_{wfr}) = S_{wfr} - S_{TF-ref} = S_{wfr}$$

The shape measurement taken by the steps above is accurate and does not need correction so long as the air gap is set properly. This could be an ideal tool architecture for Patterned Wafer Geometry (PWG) tool. It can have better precision, matching, and lower cost than the dual Fizeau interferometer architecture. The grating based shearing interferometer can greatly benefit from this tool architecture, by replacing the three supporting pins with the air-bearing chuck, which will improve measurement accuracy and increase its warp dynamic range by allowing the wafer to tilt.

For large warp wafer, a 2-D tilt station can be used to overcome dynamic range limitation of the interferometer in the WGT architecture illustrated in FIG. 1c. In horizontal position, the shape of the wafer 706 can be better maintained while tilting than if the same wafer 706' is in a vertical position, in which case, gravity can change the shape of the wafer 706' if the wafer 706' is not completely vertical, as illustrated in FIG. 7.

Figure 7:
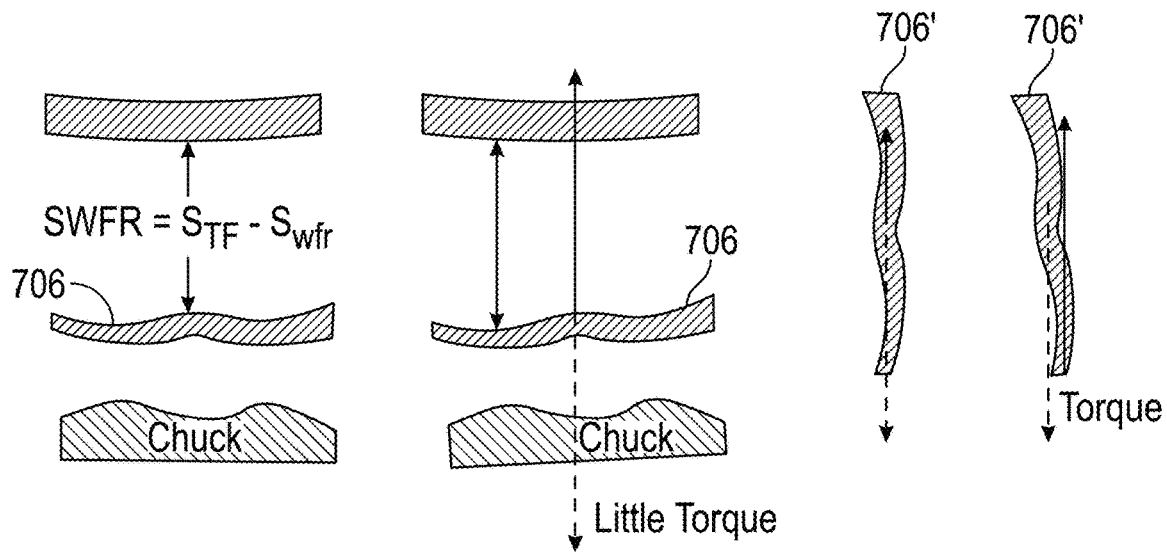
FIG. 7 illustrates that a wafer in a vertical position is prune to shape change when tilting a wafer.

Specifically, FIG. 7 Illustrates wafer 706' in vertical position is prune to shape change when tilted. This is because a torque is applied to the wafer 706' when a vertically held wafer 706' is tilted. The torque will cause the wafer shape to change. This limits measurement accuracy for the conventional duel Fizeau Interferometer tools. In comparison, the WGT architecture disclosed here supports a wafer 706 on a thin air cushion that helps maintain the natural shape of the wafer 706 even when wafer 706 is at a small tilt angle (typically smaller than a fraction of a degree), as shown in the horizontal setting of FIG. 7.

WGT can be used to measure warp of a thin wafer, where the wafer is too thin to be put in vertical position or too thin to keep its shape unchanged while the wafer is tilted in vertical position. For some thin wafers, it might be too thin to be supported at two points on wafer edge. In WGT, a wafer lies in horizontal position and is supported by the air cushion. A very small radial force is applied to the wafer to keep the wafer position while tilting the wafer. At proper flying height and vacuum/pressure settings, the warp of a thin wafer can be measured.

Accordingly, the wafer geometry tool and pattern wafer geometry tool using the above-described method can have high precision and high throughput, but at about half price as compared with the dual Fizeau architecture. It is a cost-effective and high precision solution for wafer flatness, nano-topography, and shape measurement tools for wafers of any size such as 200 mm, 300 mm, and 450 mm wafers.

Figure 8:
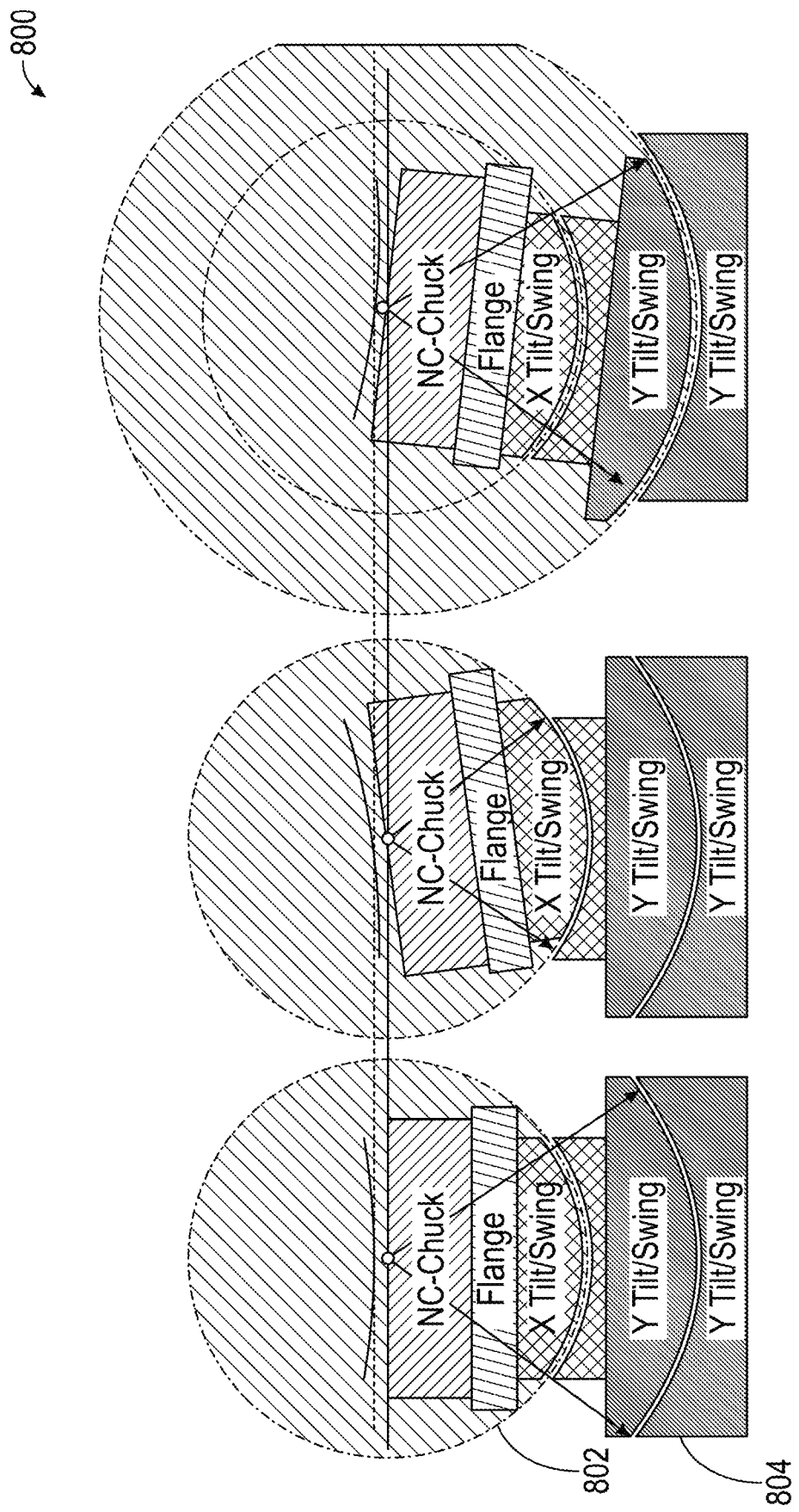
FIG. 8 illustrates an exemplary goniometry cradles for patterned wafer tilt stage, according to an embodiment of the disclosure.

FIG. 8 illustrates an exemplary goniometry cradles 800 for patterned wafer tilt stage, according to an embodiment of the disclosure. The illustrated setup includes two stacked goniometry cradles 800 that are used for increasing wafer warp dynamic range and throughput. It is possible to keep the wafer in focus while performs wafer tilt. Note, X, Y stages 802, 804 are crossed at 90 degree, but drawn in one plane for easy illustration of common center of rotation.

Method of Differentiating Real Wafer Surface Features and Chuck Marks/Artifacts

Figure 2A:
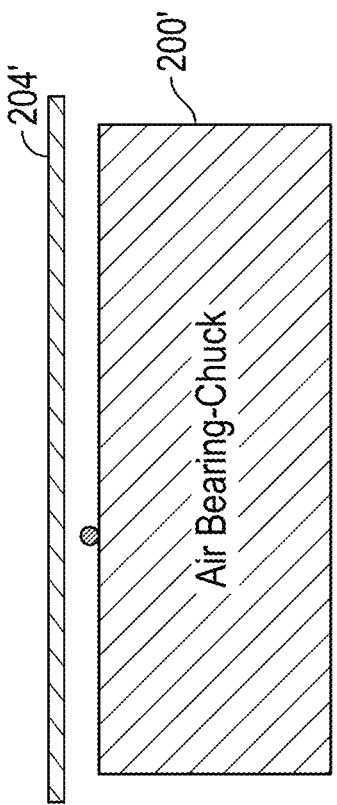
FIG. 2a illustrates an example of chuck mark/artifacts when a wafer is vacuum down on vacuum chuck.
Figure 2B:
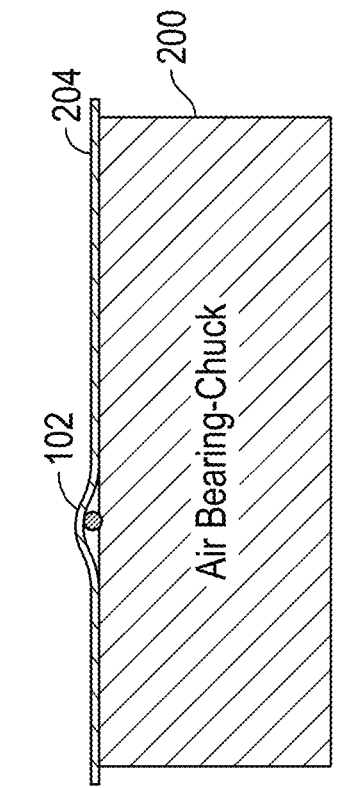
FIG. 2b illustrates a wafer flying above an air-bearing chuck, where no chuck mark was seen.

The embodiment of the WGT architecture 100 illustrated in FIG. 1c utilizes one vertical mounted Fizeau interferometer for both total thickness variation measurement and wafer shape measurement. However, in practice this method has many challenges. The air-bearing chuck itself may not be flat and there may be artifacts, such as particles, on the surface of the air-bearing chuck. When wafer is vacuumed down on the air-bearing chuck, the artifacts can show up on the top surface of the wafer. For example, a large particle 202 can appear as a bulge on the top side 204 of the air-bearing chuck 200, as illustrated in FIG. 2. These type of artifacts may be calibrated out by using a method disclosed herein, according to another embodiment of the disclosure. FIG. 2b illustrates a wafer 204' flying above an air-bearing chuck 200', where no chuck mark was seen.

Figure 3A:
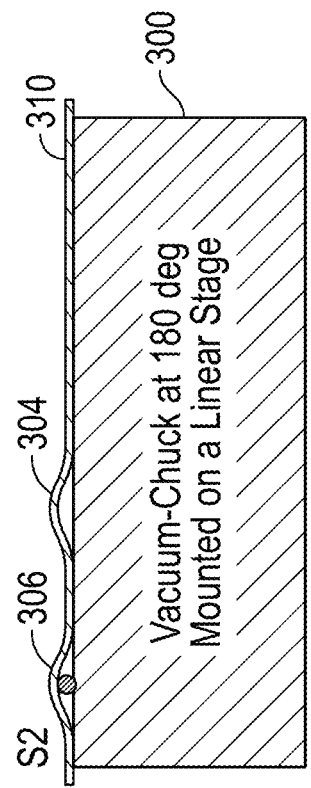
FIG. 3a-3c illustrate a method for differentiating real wafer surface features and chuck marks/artifacts, according to an embodiment of the disclosure.
Figure 3B:
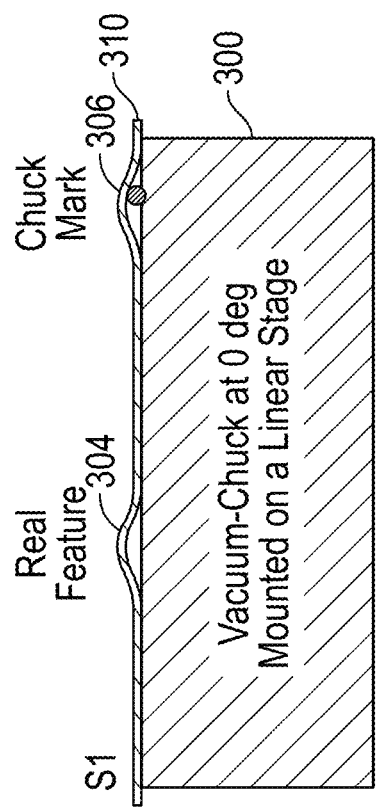
Figure 3C:
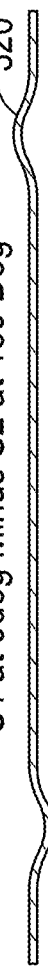

FIGS. 3a-3c illustrate a method of differentiating real features 304 on the surface of a wafer 310 from artifacts 306. FIG. 3a illustrates an S1 surface measurement where real features 304 are mixed with chuck marks 306 in the Interferometer measurement. FIG. 3b illustrates an S2 surface measurement with chuck rotated 180 degrees from its original position for the S1 surface measure. The real feature 304 stays in the same location while the chuck marks 306 rotate 180 degrees with the chuck 300. Thus, by rotating the wafer 310 180° (as illustrated in FIG. 3b) and compare the surface 302 with the surface 300 at the 0° (as illustrated in FIG. 3a), real wafer features 304 (those that stays in the same position in wafer coordinate system before and after rotation) can be identified. In contrast, the artifacts 306 would be off by 180° in position as the wafer 310 is rotated 180°.

FIG. 3c provides a S1 and S2 difference map showing chuck artifacts as bipolar pairs 316, 320. These chuck marks can be calibrated out if they do not move around on the chuck. They also have specific features that allows it to be removed by algorithm if the chuck is clean and chuck marks are isolated. The wafer or vacuum chuck rotation method can work when there are limited artifacts on the Chuck and/or the backside of the wafer. It is very imperative to keep the chuck's surface clean. Otherwise, the measurement can be contaminated by artifacts.

Air-Bearing Chuck

Figure 4A:
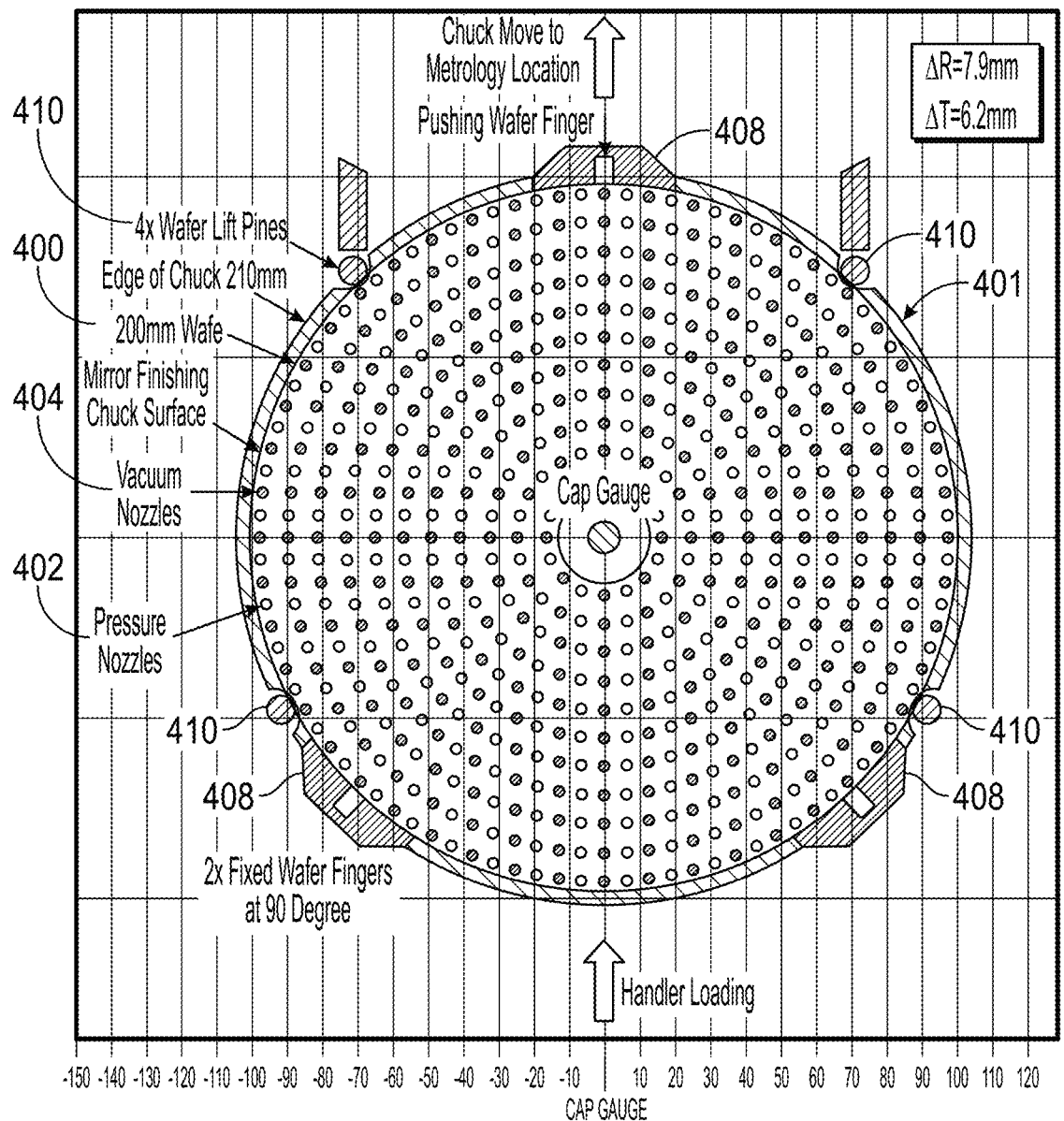
FIGS. 4a and 4b illustrate exemplary air-bearing chucks with vacuum and pressure nozzles for holding a wafer on an air cushion, according to embodiments of the present disclosure.

The embodiment of the WGT architecture 100 illustrated in FIG. 1c can achieve an artifact free measurement. In this architecture 100, the wafer 114 under test can be loaded to measurement chamber directly from handler end effector. In another aspect of the disclosure, an air-bearing chuck is disclosed. As illustrated in FIG. 4a, the air-bearing chuck 401 has an array of pressure and vacuum nozzles on chuck surface, where alternating pressure nozzles 402 and vacuum nozzles 404 are arranged in each equally spaced concentric rings.

The vacuum suction force and the pressure supporting force can keep a wafer 400 floating on an air cushion of a few micron to hundreds of microns on the air-bearing chuck 401. The thinner the air cushion, the stiffer the air-bearing. With the right flow rate of vacuum and pressure, the air-bearing can be very stiff (>1N/um, for air gap in the order of 20 um), which will also have significant wafer flattening power. However, the stiffness of a 100 um thick air-bearing could be as low as one $10^{th}$ of 1N/um, where there is little force to distort the wafer shape.

To measure wafer flatness or TTV from the front side of a wafer, the backside of the wafer 400 can be flattened by the air-bearing chuck 404 and become conforming to the chucks surface. When the air-bearing gap is set at the proper height (e.g., 15 um to 20 um), artifacts are not detected on the air-bearing chuck 401. To measure the shape of the wafer, the wafer is floated up on the surface of the air-bearing chuck 401, with the gaps set at ~60 um-300 um, where the wafer 400 is supported by the air cushion created by the air-bearing chuck 401 and maintains its original shape due to the suction force being very small at large air gap.

To meet WGT requirement for wafer flatness and shape measurement, the air-bearing chuck 404 can have the following features, as illustrated in FIG. 4a:

(1) Axis symmetric, alternating pressure and vacuum nozzles 402, 404 arranged in concentric rings.

(2) No active nozzles beyond wafer reference flats. The nozzles extend all the way out to support the wafer 400 to about the last 2-5 mm in radius. For a 200 mm chuck, the nozzles extend radially such that the center of the last set of nozzles is located on a 198 mm, or 195 mm diameter. In this embodiment, the surface of the air-bearing chuck 401 is preferably larger that the wafer 400 so there is no wafer overhang beyond the edge of the air-bearing chuck 401.

(3) To keep the tangential separation between nozzles as a constant when radius increases, preferably, there is an increase of even number of nozzles per ring, as described in the following formula N=m*n. Where, m is increase number of nozzles (m=4, 6, 8, 10 . . . ), n is the nth number of concentric rings, and N is the number of nozzles per ring, with n=0 being the first "ring" at the center of the wafer 400. The number "6" is preferred since it achieves about the same displacement between nozzles in both the radial and tangential directions.

(4) Chuck flatness for WGT 200 is preferably 1.5 um. WGT 300 is preferably 0.5 um or smaller for advanced wafer flatness applications.

(5) Chuck surface needs to be mirror like finish, >N4 per ISO standard.

(6) Chuck 404 is preferably 10 mm larger than the wafer 400 in diameter, the area of chuck that is larger than wafer can be used for calibration during wafer measurement since this part of wafer is not blocked by the wafer during measurement.

(7) 3× Wafer grippers 408, two fixed (90 degree apart), one actuating griper for center wafer. Force on the wafer 400 can be adjustable.

(8) 4× lift pins 410 that can lift wafer 400 up from chuck 404 in a smooth manner.

Figure 4B:
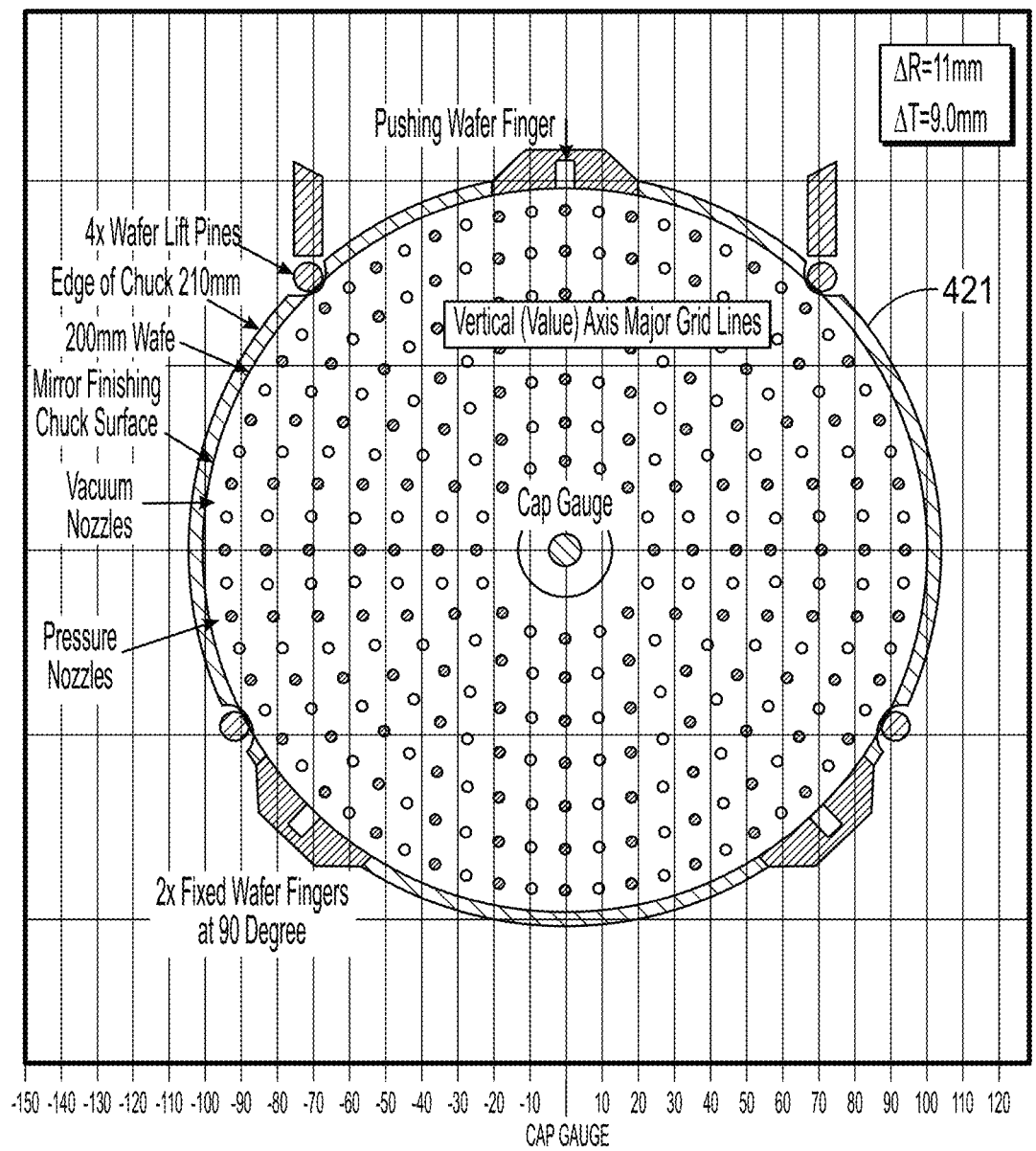

FIG. 4b illustrates an exemplary air-bearing chuck 421 with the vacuum and pressure nozzles arranged at different ΔR, ΔT as shown in the figure.

Figure 4C:
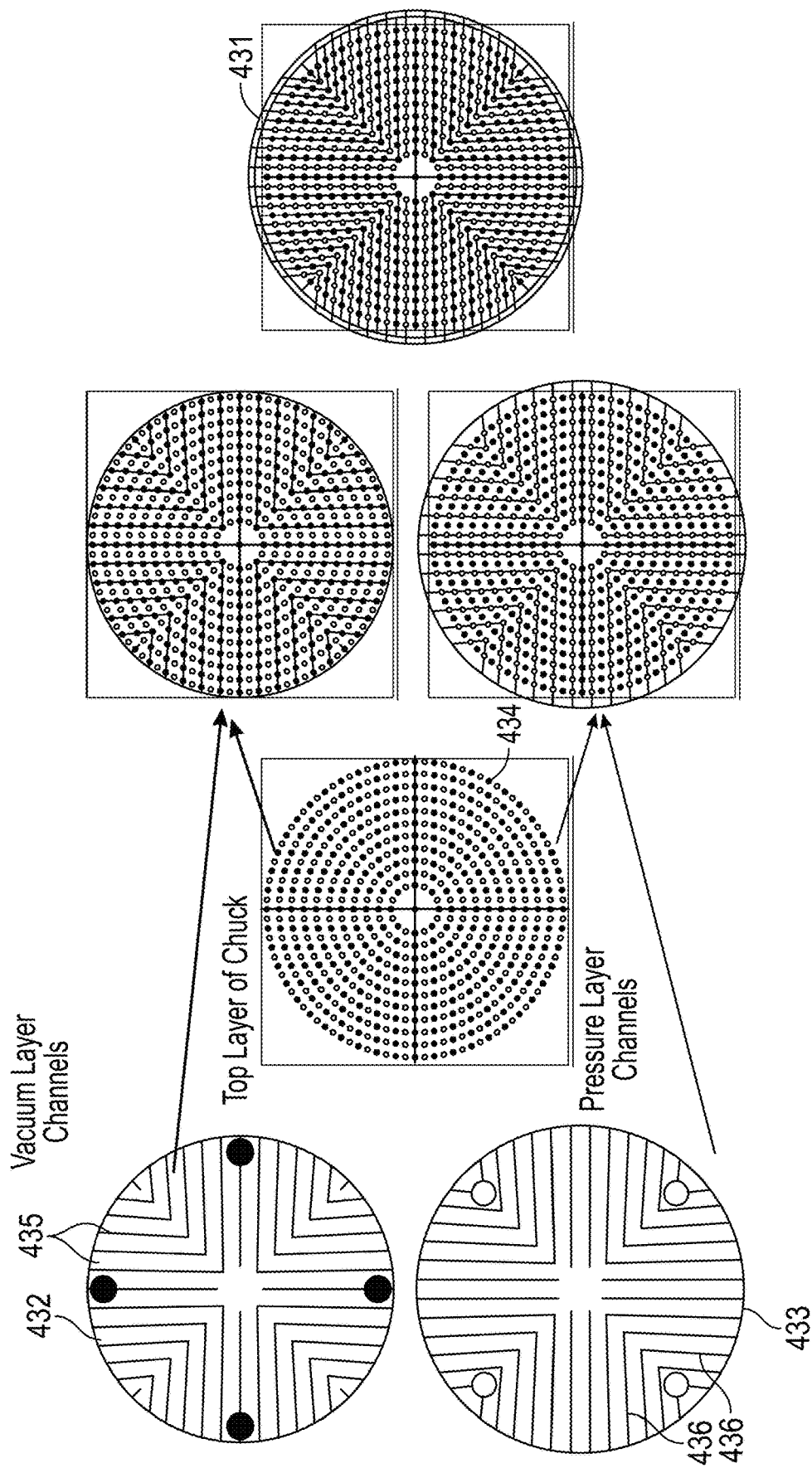
FIG. 4c illustrates pressure and vacuum nozzle connection layers of an air-bearing chuck, according to an embodiment of the present disclosure.
Figure 4D:
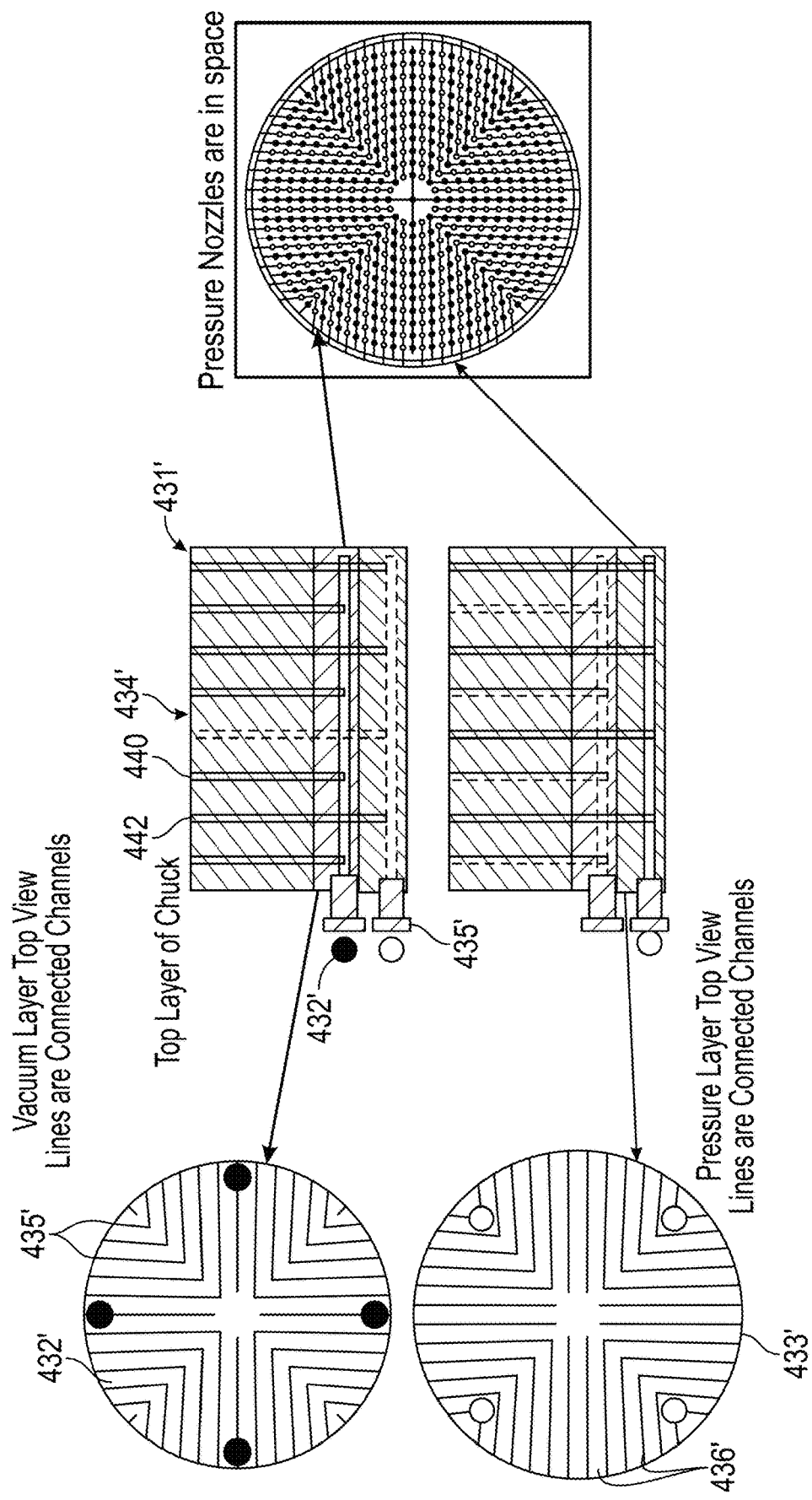
FIG. 4d illustrates pressure and vacuum nozzle layer arrangement of an air-bearing chuck, according to an embodiment of the present disclosure.

The vacuum nozzles 404 and pressure nozzles 402 connections are illustrated in FIG. 4c and FIG. 4d. FIG. 4c provides a top view of the stacked layers of an air-bearing chuck 431. The stacked layers include a vacuum manifold layer 432, a pressure manifold layer 433, and a top chuck layer 434. The vacuum manifold layer 432 connects all vacuum channels 435 and vacuum supply. The pressure manifold layer 433 connects all pressure channels 436 and pressure supply. The top chuck layer 434 includes multiple through holes connecting the vacuum channels 435 in the vacuum manifold layer 432 to the vacuum nozzles on the top surface of the top chuck layer 434. The top chuck layer 434 also includes additional through holes connecting the pressure channels 436 in the pressure manifold layer 433 to the pressure nozzles on the top surface of the top chuck layer 434. The through holes for vacuum and pressure are arranged in an alternating fashion corresponding to the vacuum and pressure nozzle arrangements shown in FIGS. 4a and 4b.

FIG. 4d provides a side view of the above-described stacked structure of the air-bearing chuck 431' including a top chuck layer 434', a vacuum manifold layer 432', and a pressure manifold layer 433'. There are alternating through holes 440, 442 connecting the vacuum channels 435' and pressure channels 436', respectively, to the vacuum nozzles and pressure nozzles on the top surface of the air-bearing chuck 431'. As illustrated in the side view of the air-bearing chuck of FIG. 4d, the separation ΔT between the alternating vacuum nozzles and pressure nozzles can be the substantially the same.

Figure 4E:
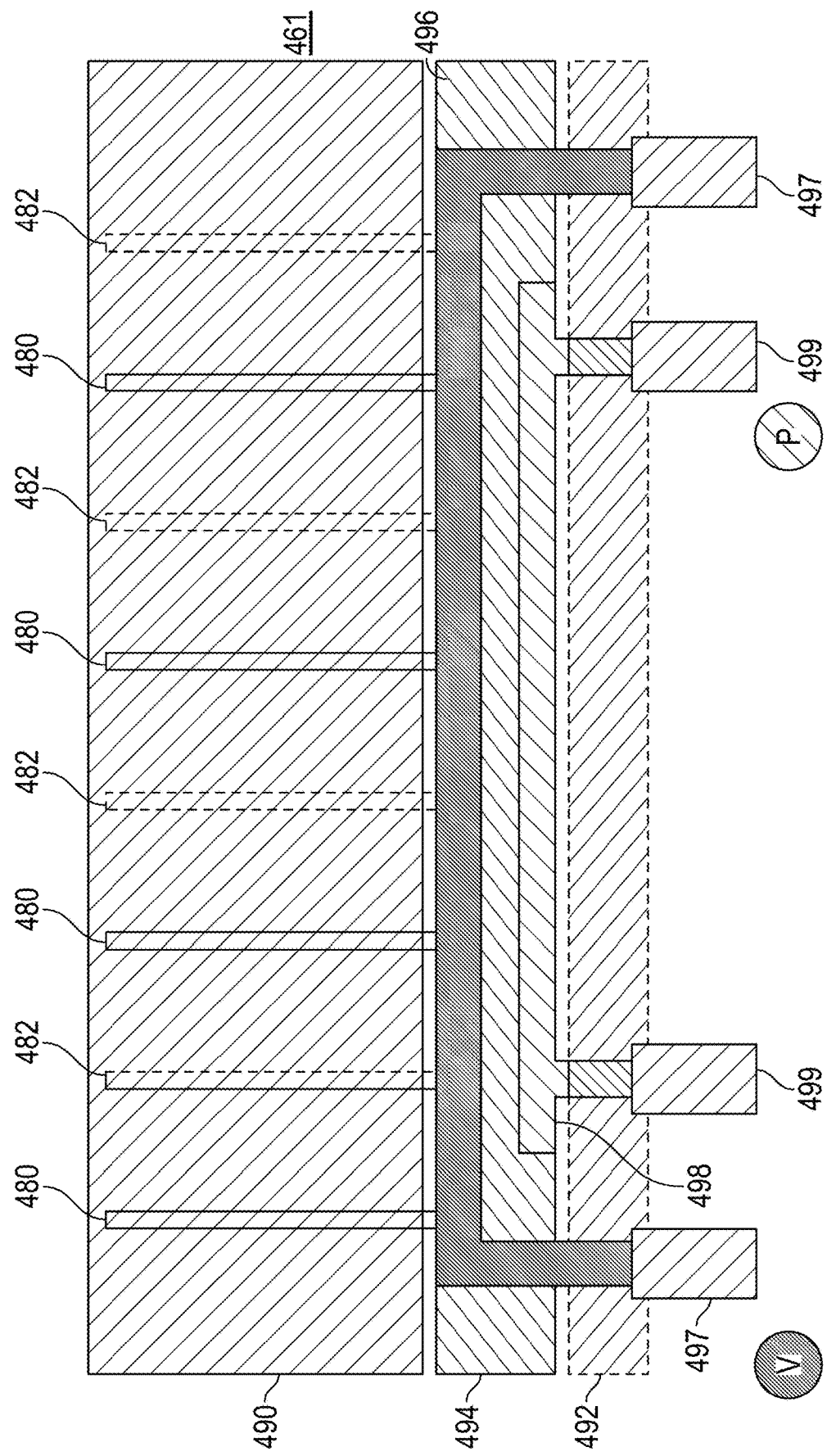
FIG. 4e illustrates another exemplary stacked structure of an air-bearing chuck, according to embodiments of the present disclosure.

FIG. 4e provides a side view of another embodiment of the stacked structure of the air bearing chuck 461. In this embodiment, the stacked structure can include a top plate 490, a back cover plate 492, and a manifold plate 494 sandwiched between the top plate 490 and the back cover plate 492. The top plate 490 can be aluminum or ceramic with a preferred thickness of between 10-60 mm. Similar to the embodiment of FIG. 4d, there are alternating through holes 480, 482 in the top plate 490 to provide vacuum suction force and pressure supporting force, respectively, to keep a wafer (not shown in FIG. 4d) floating on an air cushion. The through holes 480, 482 can have 1.25-1.5 mm diameters.

The top and bottom surfaces of the manifold plate 494 can each have one or more grooves in which vacuum and pressure channels 496, 498 can be situated, respectively. In the example illustrated in FIG. 4e, the grooves on the top surface of the manifold plate 494 can have embedded vacuum channels 496 that connect the vacuum nozzles on the top plate 490 of the stacked structure via through holes 480 to the vacuum outlet 497 on the bottom plate of the stacked structure. Similarly, the grooves on the bottom surface of the manifold plate 494 can have embedded pressure channels 498 that connect the pressure nozzles on the top plate 490 of the stacked structure via through holes 482 to the pressure outlet on the bottom plate of the stacked structure. Both the grooves on the top and bottom surfaces of the manifold plate can be a few millimeter wide and a few millimeters deep.

Figure 4F:
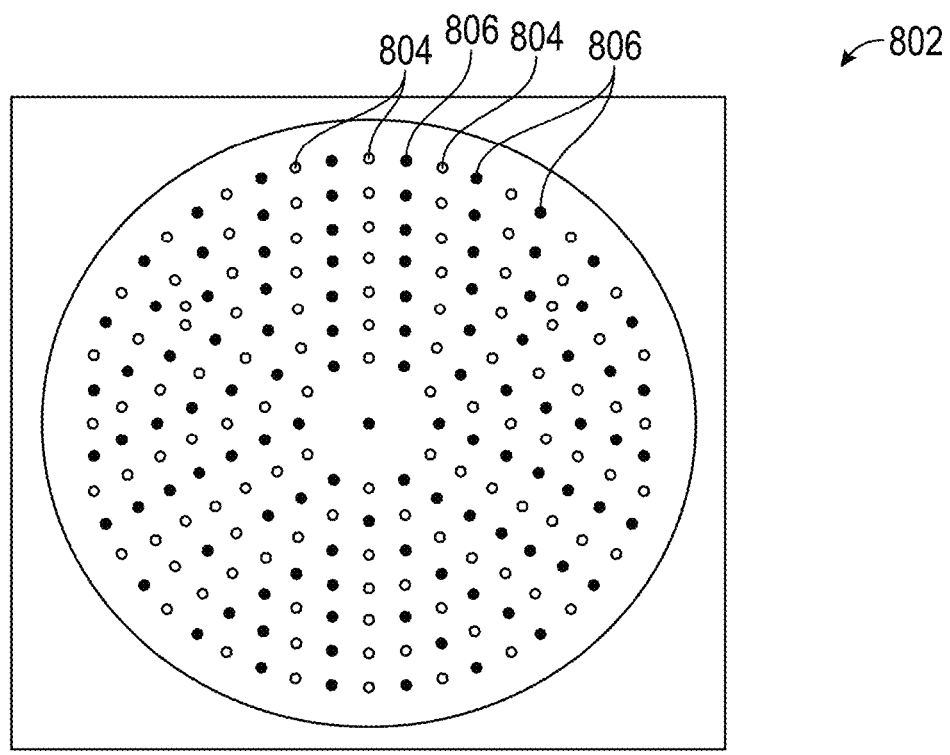
FIG. 4f illustrates an exemplary top surface of the top plate of the stacked structure of FIG. 4e, according to an embodiment of the present disclosure.

FIG. 4f illustrates an exemplary top surface 802 of the top plate 490 of the stacked structure of FIG. 4e. The top surface includes equally spaced (or nonequally spaced) alternating vacuum and pressure nozzles (or holes) 804, 806 with, for example, 5-25 mm radial and tangential spacing. The vacuum holes 804 can be a few millimeters, for example 1.5 mm in diameters. The pressure holes 806 can have 1.25 mm in diameters.

Figure 4G:
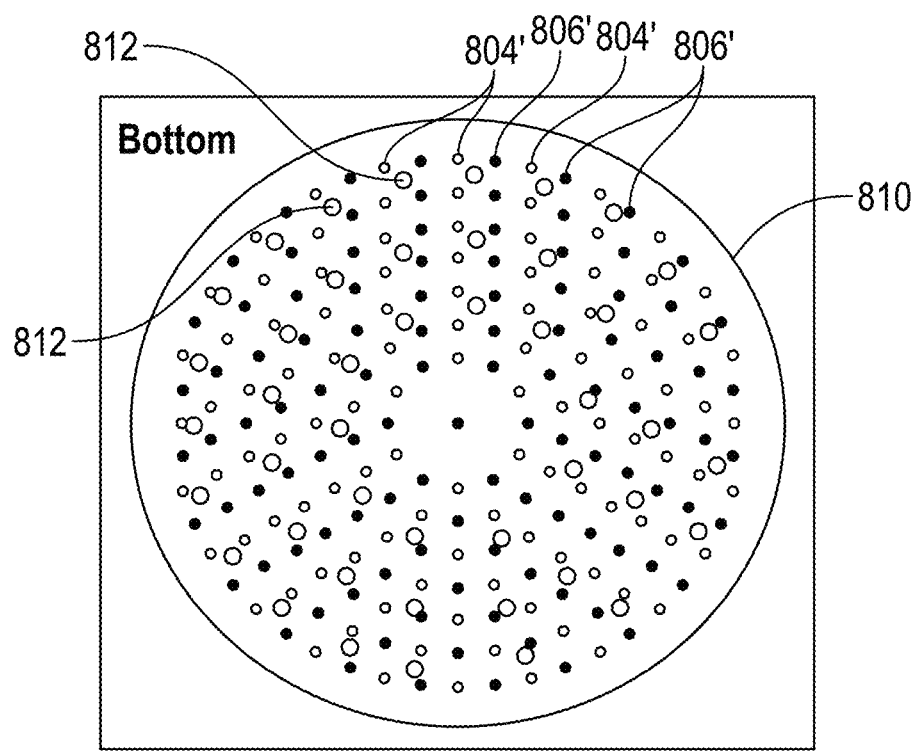
FIG. 4g illustrates an exemplary bottom surface of the top plate of the stacked structure of FIG. 4e, according to an embodiment of the present disclosure.

FIG. 4g illustrates an exemplary bottom surface 810 of the top plate, showing the same pattern of vacuum and pressure nozzles 804' 806'. The bottom surface 810 can also include M3.5 or M4 threaded holes 812 for fastening the plates of the stacked structure together and seal the vacuum and pressure channels. Alternatively, glue can be used to hold the plates together, which may result in improved top surface flatness. If glue is used, there is no need to have any M3.5 or M4 or any other threaded holes on the plates.

Figure 4H:
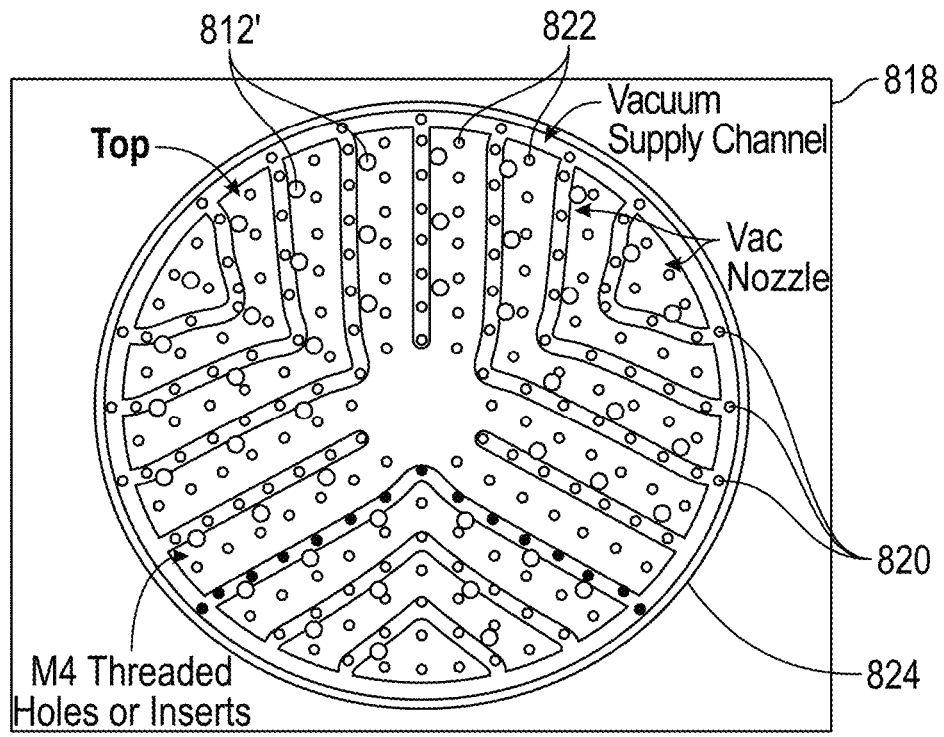
FIG. 4h provides a top view of an exemplary manifold plate of the stacked structure of FIG. 4e, according to an embodiment of the present disclosure.
Figure 4I:
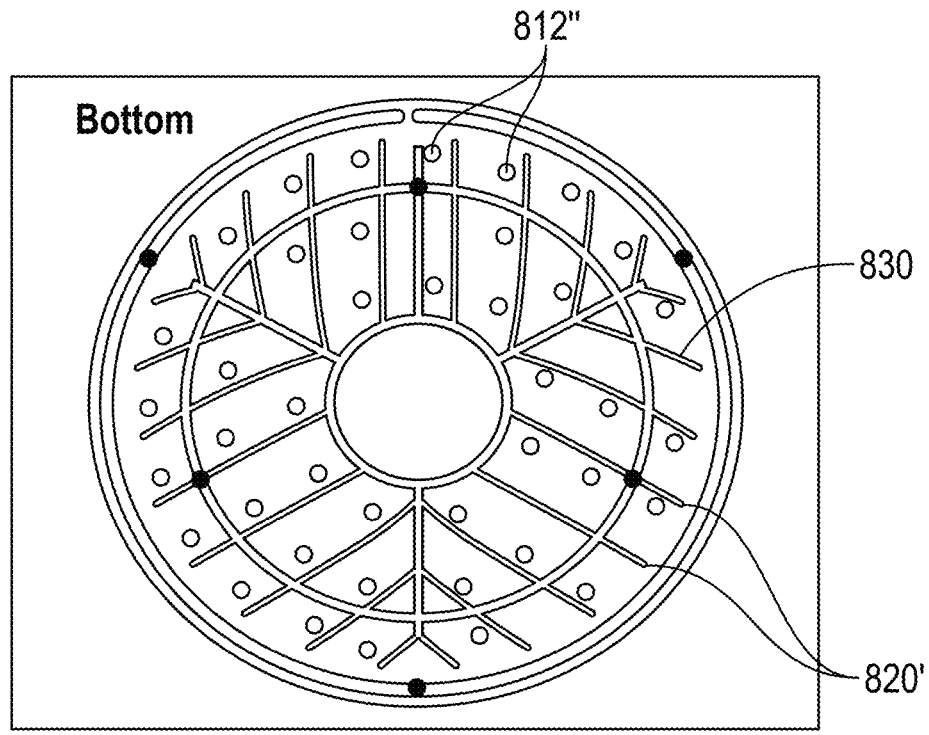
FIG. 4i provides a bottom view of an exemplary manifold plate of the stacked structure of FIG. 4e, according to an embodiment of the present disclosure.

FIG. 4h provides a top view of an exemplary manifold plate 494 of the stacked structure of FIG. 4e. All vacuum holes from top plate (not shown in FIG. 4h) connect to one of the vacuum channels 820 in the grooves on the top surface 818 of the manifold plate 494. By contrast, all pressure holes from top plate (not shown in FIG. 4h) connect to corresponding pressure holes 822 in the manifold plate 494, forming a straight hole from the top plate down through the manifold plate 494 (as shown in FIG. 4e), thereby connecting the pressure nozzles on the top plate to the pressure channels embedded in the grooves at the bottom of the manifold plate 494 (as shown in FIG. 4i). In one embodiment, the vacuum channels 820 on the top surface of the manifold plate 494 can be in the pattern shown in FIG. 4h. The channels are align with the vacuum nozzles on the top plate and connected by an outer circular channel 824 along the edge of the manifold plate 494. FIG. 4h also shows M3.5 or M4 threaded holes 812' for fastening the plates of the stacked structure together.

FIG. 4i illustrates a bottom view of the manifold plate 494. In this embodiment, the pressure channels/grooves 830 can be in an inner ring-like pattern ("pressure supply rings") connecting the pressure holes that are through the manifold plate 494. The pressure supply rings can be less resistance due to the increased cross section. The bottom view of FIG. 4i also shows the M3.5 or M4 threaded holes 812" that are visible in the top view of FIG. 4h. Although the bottom view also shows superimposed vacuum channels 820', it should be understood that it is only for illustration purpose and the actual vacuum channels 820' are situated in grooves on the top surface of the manifold plate 494 as shown in FIG. 4h.

Figure 4J:
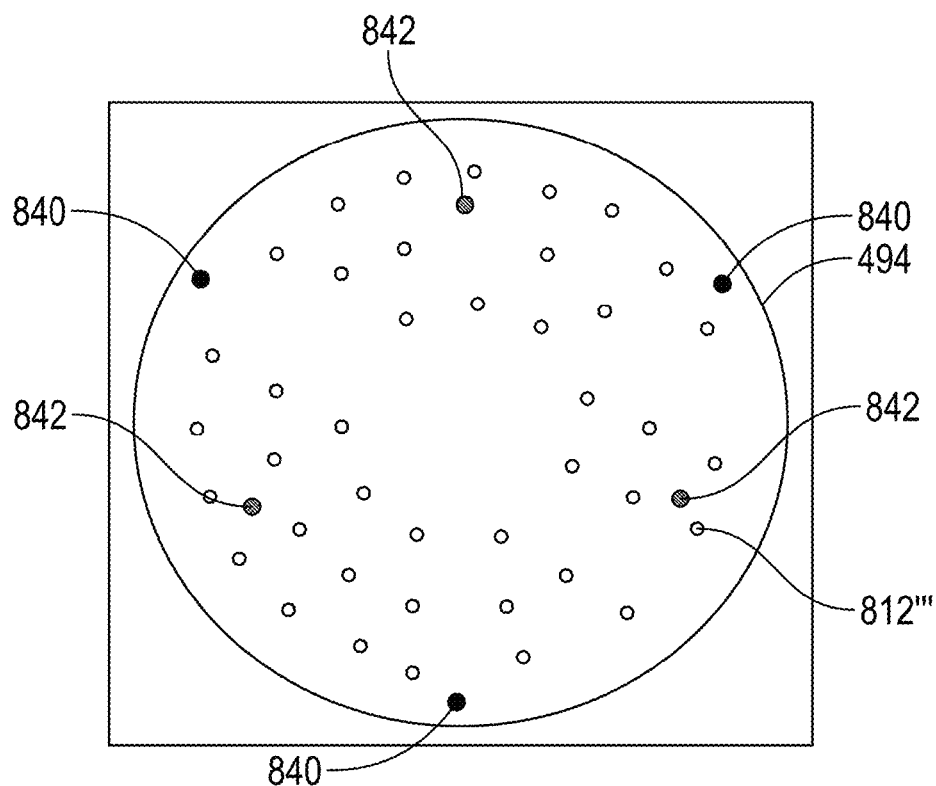
FIG. 4j provides a top view of the back cover plate of the stacked structure of FIG. 4e, according to an embodiment of the disclosure.
Figure 4K:
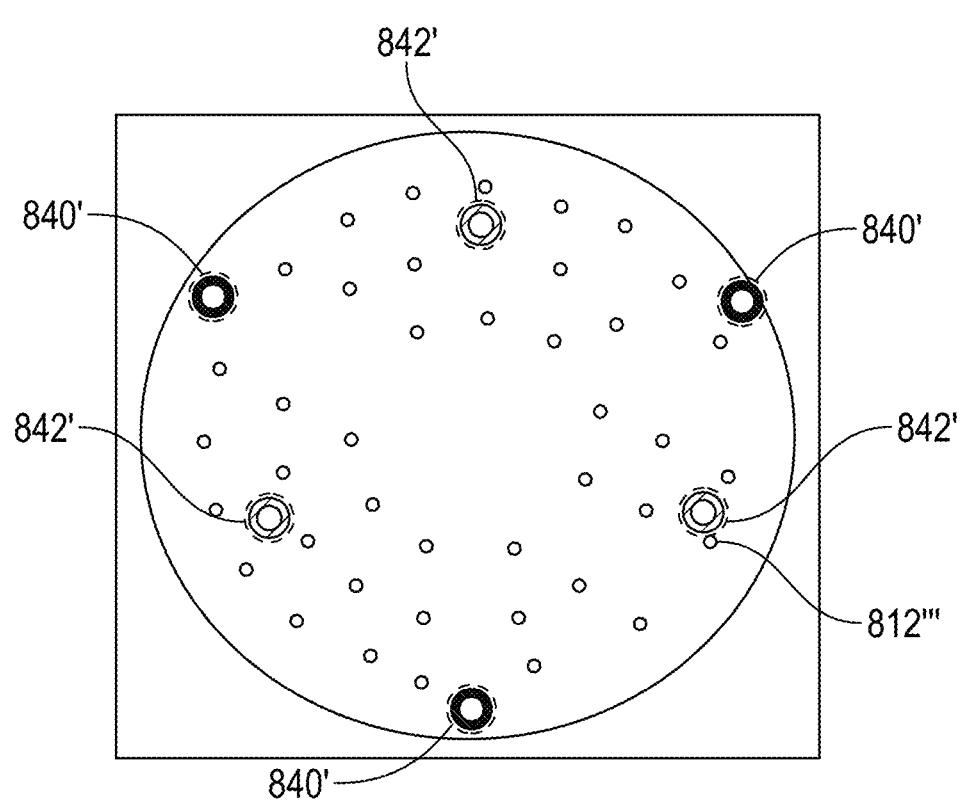
FIG. 4k provides a bottom view of the back cover plate of the stacked structure of FIG. 4e, according to an embodiment of the disclosure.

FIG. 4j provides a top view of the back cover plate 492 of the stacked structure of FIG. 4e. The top surface of the back cover plate 492 can be polished for sealing the manifold bottom surfaces embedded with pressure grooves as shown in FIG. 4i. In this embodiment, there are three openings 842 for connecting the pressure channels from the bottom surface of the manifold plate 492 to the pressure fittings (not shown in FIG. 4j). In addition, there are three other openings 840 for connecting the vacuum channels from the top surface of the manifold plate to the vacuum fittings (not shown in FIG. 4j). The same pressure and vacuum openings 842', 840' are also shown on the bottom view of the back cover plate 492 in FIG. 4k. Both the top view of FIG. 4j and bottom view of FIG. 4k of the back cover plate 492 also illustrate the M3.5 or M4 threaded holes 812''' for fastening the back cover plate with the other plates in the stacked structure.

Although FIGS. 4e-4k illustrate a stacked structure of the air-bearing chuck having pressure and vacuum channels situated in grooves on the bottom and top surface of a manifold layer, respectively, it should be understood that these channels can also be embedded in grooves of the other layers. For example, the vacuum channels can be situated in grooves formed on the bottom layer of the top plate and the pressure channels can be situated in grooves formed on the top layer of the bottom cover plate. Furthermore, it should be understood that the placement of the vacuum channels and the pressure channels can be switched in other embodiments. In various embodiments, different numbers of vacuum and/or pressure nozzles can be included. The routing of the vacuum and pressure channels can be adjusted according to the number and locations of the nozzles. The number of vacuum and pressure fittings at the bottom of the stacked structure can also be different than 3 each.

Figure 9A:
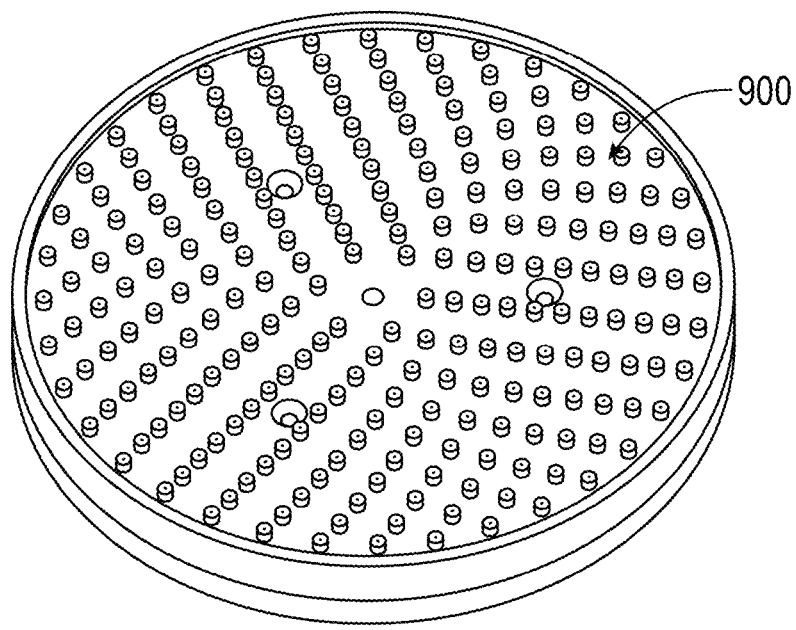
FIGS. 9a and 9b illustrate an exemplary Plenum manifold design, according to an embodiment of the disclosure.
Figure 9B:
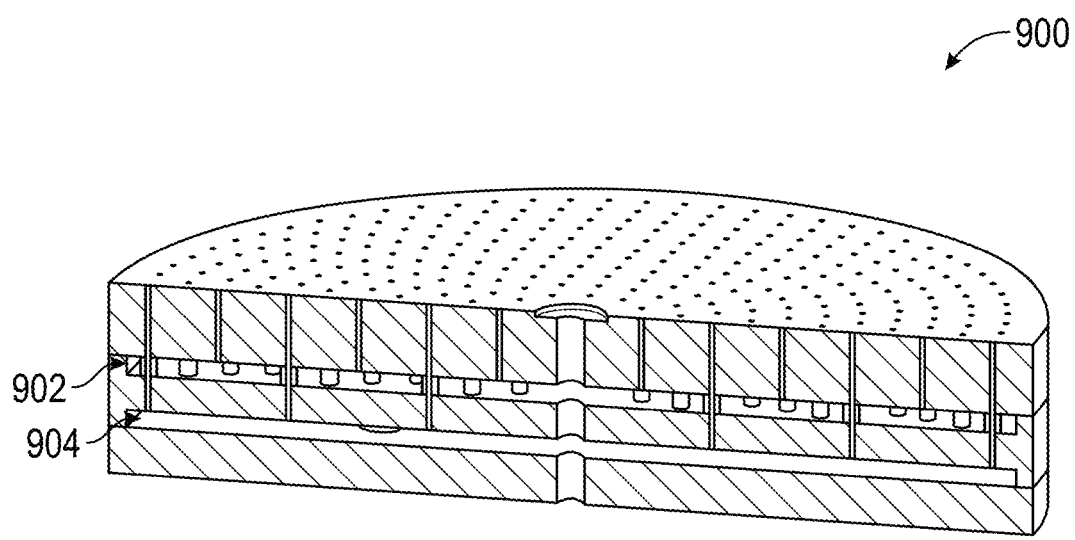

To achieve uniform pressure and vacuum across the whole chuck, a plenum manifold 900 as illustrated in FIGS. 9a and 9b can be used for separating vacuum nozzles from those pressure nozzles, where all the vacuum nozzles are connected to the vacuum manifold plenum 902, while all the pressure nozzles go straight through the vacuum manifold plenum 902, and reach pressure manifold plenum 904 that is right under the vacuum plenum. CFD simulation showed that the plenum approach greatly improves the uniformity of the vacuum and pressure nozzles. Plenum manifold can provide uniformly pressurized air volume, optimize increasing channel sizes to the largest extent possible. In addition, cavity height can be tuned to minimize orifice flow variations.

Air cushion that supports wafer also has air damping effects, which effectively isolate seismic and acoustic vibration, eliminating or reducing the requirement of acoustic isolation box and active vibration isolation system.

There are additional advantages of using the air-bearing chucks disclosed in the embodiments above. For example, it can improve the accuracy of the thickness measurement of a mask layer applied on the wafer. In 3D NAND process, there is an unmet need for measuring highly opaque hardmask film thickness since traditional optical method does not work well in opaque films. WGT wafer thickness measurement feature can be used for the measurement of hard mask film thickness. Two measurement of wafer thickness were made, e.g. one "pre-mask" ($T_{pre}$) thickness measurement, one "post-mask" ($T_{post}$) thickness measurement, where $$T_{pre}=T0+E\_RTE\_pre$$

$$T_{post}=T1+E\_RTE\text{-post}$$

T0 and T1 are the thickness measurements pre and post-mask film deposition, respectively. E_RTE_pre and E_RTE-post are the respective ray tracing errors (RTE) of the wafer pre and post-mask.

Accordingly, the thickness of the mask $\Delta T=T_{post}-T_{pre}=$ (T1−T0)+(E_RTE-post−E_RTE_pre)

Because the wafer can warp dramatically after the mask is applied, RTE (i.e., E_RTE-post−E_RTE_pre) can significantly affect the $T_{pre}$ and $T_{post}$ measurements, resulting in significant errors in the $\Delta T$ calculation. According to the embodiments disclosed herein, the suction force created by the air-bearing chuck can substantially flatten the wafer after the mask is applied on the surface of the wafer so that the wafer shape pre and post mask are substantially the same, thereby minimizing RTE (i.e., E_RTE-post−E_RTE_pre~0) and increasing the accuracy of the thickness measurement.

The air-bearing chuck can be used to reduce or cancel ray tracing error of interferometer by forcing highly warped wafer to conform to the chuck surface, or reduce the wafer warpage of the post film deposition so that the shape of the post-film-deposition is comparable to that of pre-film-deposition, which will result in cancellation of the ray tracing error when the difference of the film thickness is calculated by subtracting post-film-deposition wafer thickness from the that of the pre-film deposition This method applies to thickness measurement of opaque hard mask layers, where the ray tracing error due to the highly warped wafer is significantly reduced In one aspect of the disclosure, a wafer shape and flatness measurement apparatus is disclosed. The apparatus includes: a single Fizeau interferometer comprising a transmission flat, a light source, a PBSC, a collimator, relay lens, and a camera; an air-bearing chuck configured to creating an air cushion for holding a wafer at a predetermined distance from a surface of the air-bearing chuck, the air-bearing chuck comprising alternating vacuum nozzles and pressure nozzles.

In some embodiments, the alternating vacuum nozzles and pressure nozzles are arranged in one of Cartesian or polar coordinates.

In some embodiments, the alternating vacuum nozzles and pressure nozzles are arranged in a plurality of concentric rings and a distance between adjacent vacuum and pressure nozzle is substantially uniform on each concentric nozzle ring.

In some embodiments, the nozzles are configured to support the wafer to about 2-5 mm near an edge of the wafer.

In some embodiments, the air-bearing chuck has a 5-30 um flying height to support wafer and flatten wafer backside for wafer flatness measurement by using the single interferometer.

In some embodiments, the air-bearing chuck has a 60-350 um flying height to support wafer while maintaining the original shape of the wafer for wafer shape measurement by using the single interferometer.

In some embodiments, the air-bearing chuck is a reflective chuck made of aluminum or other material that is stiff and can be polished with a mirror like finish; wherein the polished surface is sufficiently flat to show interference fringes.

In some embodiments, the air-bearing chuck and the transmission flat forms an optical cavity that allows calibration to be perform.

In some embodiments, the calibration comprises taking out any flatness imperfection of the transmission flat and the air-bearing chuck.

In some embodiments, a diameter of the air-bearing chuck is slightly larger than a diameter of the wafer.

In some embodiments, the diameter of the wafer is 200 MM and the diameter of the chuck is 210-2020 MM.

In some embodiments, the diameter of the wafer is 300 MM and the diameter of the chuck is 310-330 MM.

In some embodiments, the air cushion is about 5-30 um.

In some embodiments, the air-bearing chuck has a mirror-finished surface >=N4 of ISO standards.

In some embodiments, the air-bearing chuck is calibrated by using cavity data on one or more chuck surfaces.

In some embodiments, mechanical phase shifting or wavelength phase shifting or PL phase shifting is utilized; and, optionally, none common path is minimized by bring the wafer close to the transmission flat.

In some embodiments, high air flow is provided by the air-bearing chuck to achieve high stiffness of air-bearing.

In some embodiments, the air cushion has a 5-30 um flying height for wafer flatness measurements.

In some embodiments, the air cushion comprises an air gap of 60-300 um to reduce wafer shape change due to wafer tilt and wafer thermal expansion.

In some embodiments, the alternating vacuum nozzles and pressure nozzles are arranged in a pattern that is axis symmetric; and wherein the alternating vacuum nozzles and pressure nozzles are spaced equally across the whole chuck.

In some embodiments, the wafer shape and flatness measurement apparatus can further include a capacitive sensor at a middle of the air-bearing chuck for air gap monitoring and correction of non-conforming error.

In some embodiments, the capacitive sensor is further configured to serve as wafer presence sensor for wafer recovery when SW needs be reset or after a loss of power.

In some embodiments, the wafer shape and flatness measurement apparatus can further include a position sensor on a top of the wafer and a capacitive sensor at a bottom of the wafer, the position sensor and the capacitive sensor forming a hybrid thickness measurement gauge.

In some embodiments, the wafer shape and flatness measurement apparatus can further include: a Z-tip-and-tilt stage for chuck alignment and mechanical phase shifting.

In some embodiments, the Z-tip-and-tilt stage is further configured for measuring high warp wafers for Pattern Wafer Geometry application.

In some embodiments, $S_{N.C.}$ can be obtained by using a wafer with known TTV; and $S_{N.C.}$ is a function of wafer thickness, temperature, FH, and chuck flatness; and wafer thickness, temperature, FH, and chuck flatness are collected during measurement, and subsequently used for calibration correction.

In some embodiments, the Z-tip-and-tilt stage is further configured for measuring highly warped thin wafers with thickness as small as 300 um.

In another aspect of the disclosure, calibrate cap sensor and PSD by adjusting wafer height on an air-bearing chuck and using Fizeau interferometer of the tool architecture for precision measurement of the height change is disclosed.

In some embodiment, the air-bearing chuck can be used to reduce or cancel ray tracing error of interferometer in wafer thickness or film thickness measurement.

In some embodiments, air-bearing phase shifting, a new method of generating phase shift by adjusting air-bearing pressure or vacuum, is disclosed. Wafer flying height will be changed. At proper vacuum, pressure and airflow rate, linear phase shifting is possible. It has the potential to replace mechanical phase shifter with almost zero cost.

In some embodiments, interferometer assisted wafer thickness measurement is disclosed, where both cap sensor and PSD are calibrated in situ, which will result in more accurate wafer and film thickness measurement. The combination of interferometer and thickness gauge will help to improve film measurement precision to <10 nm.

In some embodiments, wafer shape measurement can be done on a chuck with only air pressure nozzles, where vacuum nozzles are not needed. The pressure nozzles supports the weight of the wafer on Air-bearing chuck.

In some embodiments, an alternative method for wafer flatness measurement, where wafer backside shape is measured by flip the wafer under tests. The TTV map is put together by aligning front and backside wafer center and notch positions. The wafer center thickness is determined by the insitue thickness gauge.

In some embodiments, WGT TTV measurement is more accurate than traditional method. WGT is more resemble the real use case of wafer on lithography chuck, where backside of the wafer is flattened by lithography chuck. The TTV measure by WGT is more likely to be consistent with what lithography tool sees.

In some embodiments, for patterned wafer shape measurement, two stacked goniometry cradles will be used to increase wafer warp dynamic range and throughput. It is possible to keep the wafer in focus while performs wafer tilt.

In some embodiments, a plenum vacuum (or pressure) manifold is proposed to greatly improve the uniformity of the vacuum and pressure nozzles.

In some embodiments, air cushion of the chuck provides air damping, which effectively isolate seismic and acoustic vibration.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A wafer shape and flatness measurement apparatus comprising:
    a large aperture interferometer, and
    a reflective air bearing chuck comprising alternating vacuum nozzles and pressure nozzles arranged in a plurality of concentric rings and a distance between adjacent vacuum nozzle and pressure nozzle is substantially uniform for the vacuum nozzles and pressure nozzles on each concentric nozzle ring.

2. The wafer shape and flatness measurement apparatus of claim 1, wherein the large aperture interferometer is one of a single Fizeau interferometer, a grating-based shearing interferometer, and a Michelson interferometer.

3. The wafer shape and flatness measurement apparatus of claim 1, wherein the reflective air bearing chuck comprises a vacuum manifold layer, a pressure manifold layer, and a top chuck layer on top of both the vacuum manifold layer and the pressure manifold layer, the top chuck layer comprises the vacuum nozzles and the pressure nozzles.

4. The wafer shape and flatness measurement apparatus of claim 1, wherein the pressure nozzles are configured to support the wafer to about 2-5 mm near an edge of the wafer.

5. The wafer shape and flatness measurement apparatus of claim 1, wherein the reflective air-bearing chuck has a 5-30 um flying height to support a wafer and flatten a backside of the wafer for wafer flatness measurement by using the single Fizeau interferometer.

6. The wafer shape and flatness measurement apparatus of claim 5, wherein the reflective air bearing chuck has a 60-350 um flying height to support the wafer while maintaining the original shape of the wafer for wafer shape measurement by using the single Fizeau interferometer.

7. The wafer shape and flatness measurement apparatus of claim 1,
    wherein the reflective air bearing chuck is made of aluminum or ceramic; and
    wherein the reflective air bearing chuck comprises a polished surface that is sufficiently flat to show interference fringes.

8. The wafer shape and flatness measurement apparatus of claim 1,
    wherein large aperture interferometer comprises a transmission flat; and
    wherein the reflective air bearing chuck and the transmission flat form an optical cavity that allows calibration to be perform.

9. The wafer shape and flatness measurement apparatus of claim 8, wherein the calibration comprises removing any flatness imperfection of the transmission flat and the air bearing chuck.

10. The wafer shape and flatness measurement apparatus of claim 1, wherein a diameter of the air bearing chuck is slightly larger than a diameter of a wafer supported by the air-bearing chuck.

11. The wafer shape and flatness measurement apparatus of claim 1, wherein the reflective air bearing chuck is calibrated by using cavity data on one or more chuck surfaces.

12. The wafer shape and flatness measurement apparatus of claim 1, wherein the reflective air bearing chuck is configured to provide high air flow to achieve high stiffness of air-bearing.

13. The wafer shape and flatness measurement apparatus of claim 1, wherein alternating vacuum nozzles and pressure nozzles are spaced equally across the whole reflective air bearing chuck.

14. The wafer shape and flatness measurement apparatus of claim 1, further comprising a capacitive sensor at a middle of the reflective air bearing chuck, the capacitive sensor configured to monitor air gap.

15. The wafer shape and flatness measurement apparatus of claim 14, wherein the capacitive sensor is further configured for wafer recovery.

16. The wafer shape and flatness measurement apparatus of claim 1, further comprising a position sensor and a capacitive sensor configured to measure a thickness of a wafer positioned between the position sensor and the capacitive sensor.

17. The wafer shape and flatness measurement apparatus of claim 1, further comprising a Z-tip-and-tilt stage configured for chuck alignment and mechanical phase shifting.

18. The wafer shape and flatness measurement apparatus of claim 17, wherein the Z-tip-and-tilt stage is further configured to measure highly warped wafers.

19. The wafer shape and flatness measurement apparatus of claim 18, wherein the Z-tip-and-tilt stage is further configured to measure highly warped wafers with a thickness of 300 um.

20. The wafer shape and flatness measurement apparatus of claim 1, wherein the reflective air bearing chuck comprises a mirror-finished surface >=N4 of ISO standards.

* * * * *